US005533466A

United States Patent [19]
Kohus et al.

[11] Patent Number: 5,533,466
[45] Date of Patent: Jul. 9, 1996

[54] PET HABITAT WITH ENHANCED VIEWING

[76] Inventors: Louis M. Kohus, 6219 Woodlark Dr., Cincinnati, Ohio 45230; John C. Henning, 20 Applewood Dr., Fairfield, Ohio 45014; Chow-Chi Huang, 120 Carrington La. #312, Loveland, Ohio 45140; Glen V. Walter, 8 Webb St., Middleton, Mass. 01949

[21] Appl. No.: 262,139

[22] Filed: Jun. 20, 1994

[51] Int. Cl.$^6$ ................................. A01K 31/06
[52] U.S. Cl. ........................... 119/459; 119/461
[58] Field of Search .......................... 119/17, 19

[56] References Cited

U.S. PATENT DOCUMENTS

| | | | |
|---|---|---|---|
| 3,774,576 | 11/1973 | Moore | 119/17 |
| 4,016,833 | 4/1977 | Ray | 119/17 |
| 4,552,093 | 11/1985 | Puckett | 119/17 |
| 5,000,121 | 3/1991 | Daily | 119/17 |
| 5,327,852 | 7/1994 | Gingrich | 119/19 |

*Primary Examiner*—Robert P. Swiatek
*Attorney, Agent, or Firm*—Charles R. Wilson

[57] ABSTRACT

A pet habitat for housing at least one pet animal has a side wall barrier which allows an unobstructed viewing of the animal. The pet habitat comprises a base member, at least two substantially vertical posts secured to the base member, the side wall barrier and a top member dimensioned to overlie the posts and be secured thereto. The side wall barrier is formed from at least one substantially clear side wall section removably mounted on adjacent vertical posts and, in the preferred embodiments, at least one wire frame side wall section mounted on adjacent posts. The clear side wall and wire frame member sections collectively form the side wall barrier. The clear wall section is readily removed and cleaned when needed so that enhanced viewing of the interior of the habitat is maintained.

44 Claims, 33 Drawing Sheets

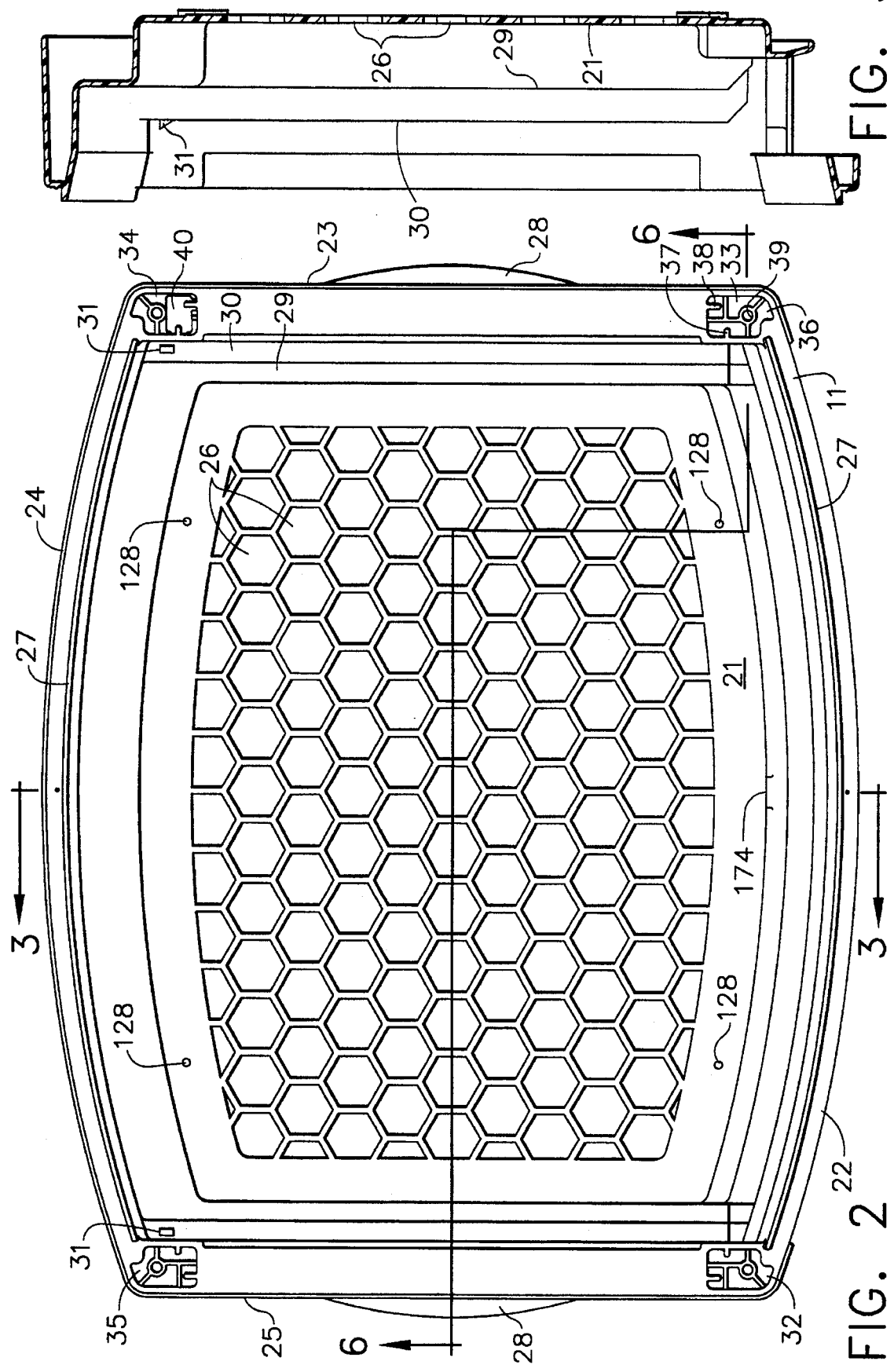

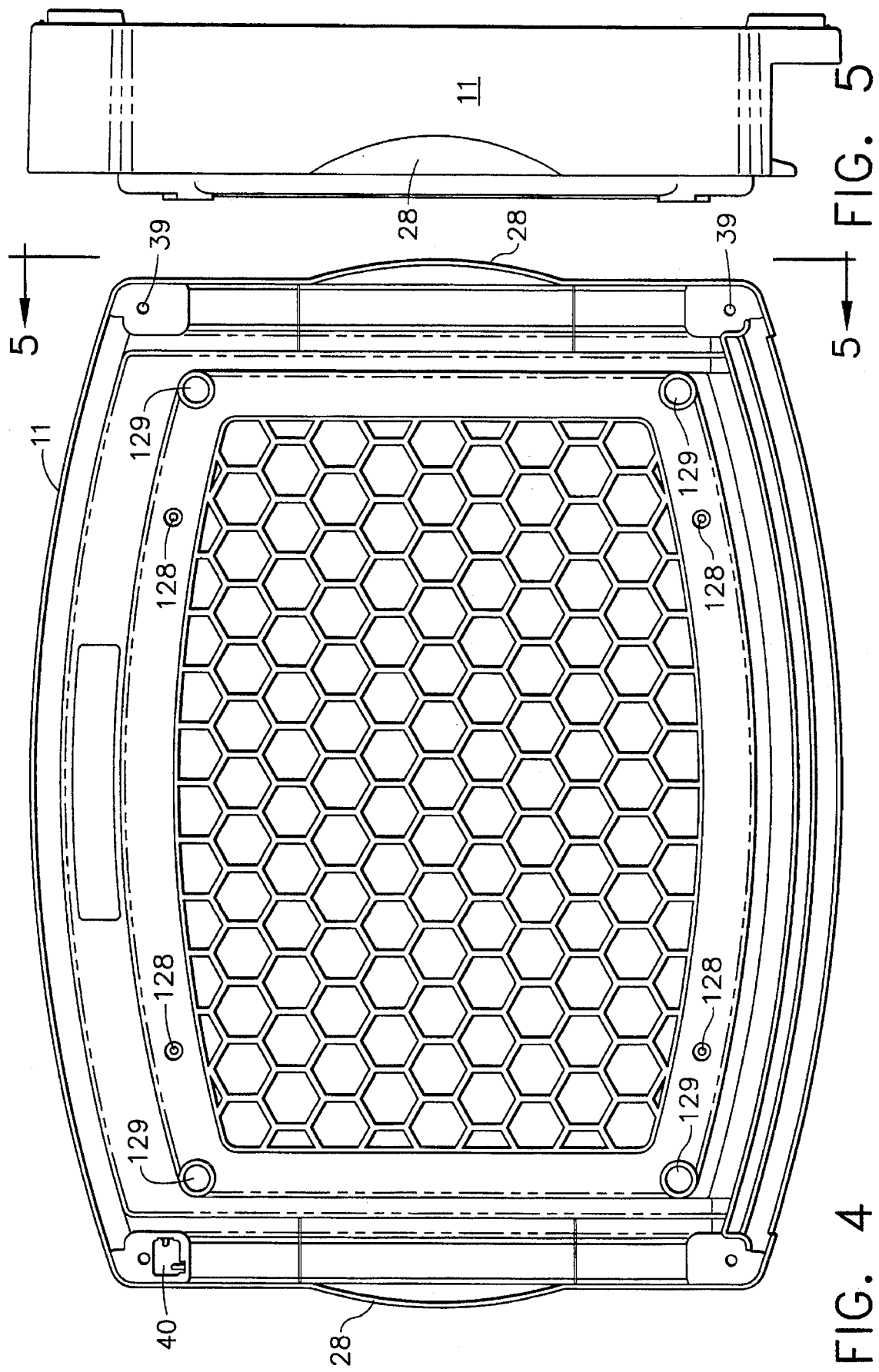

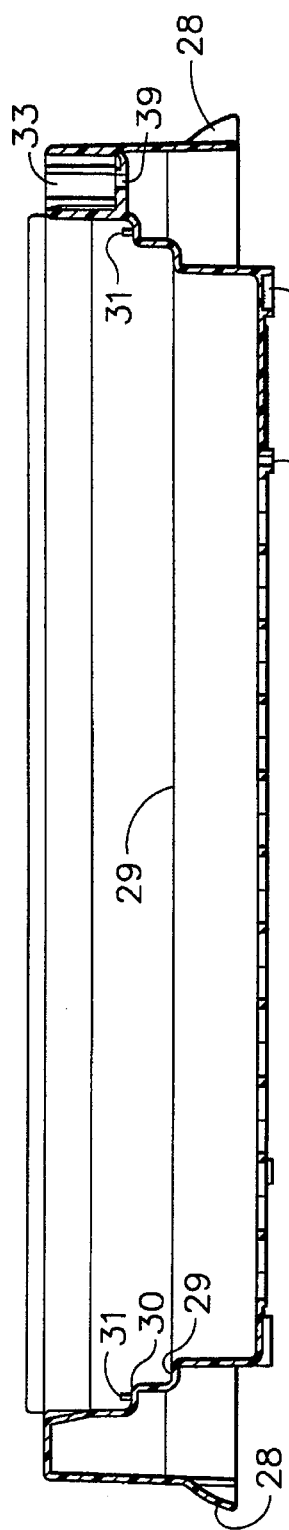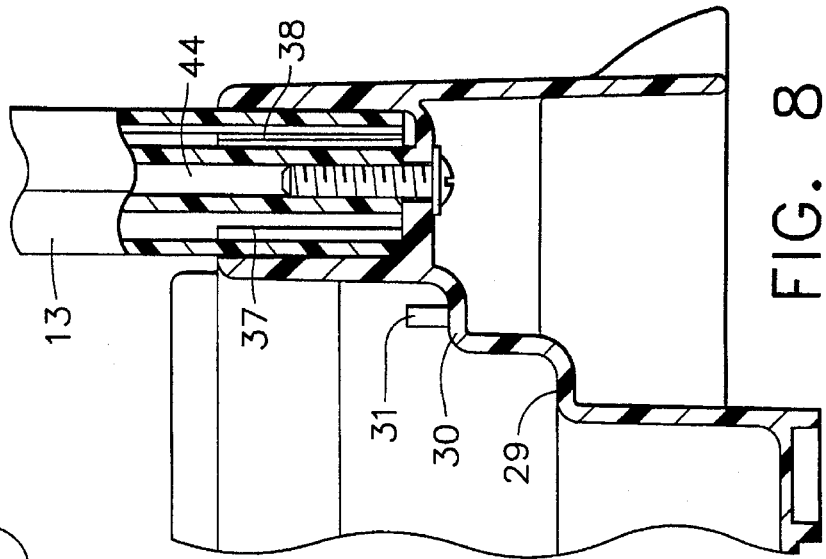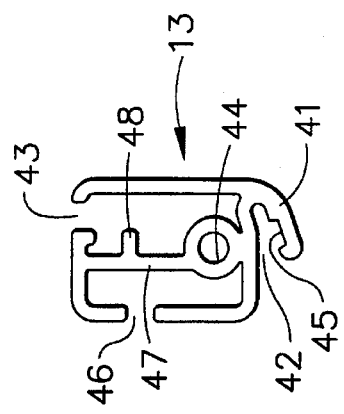

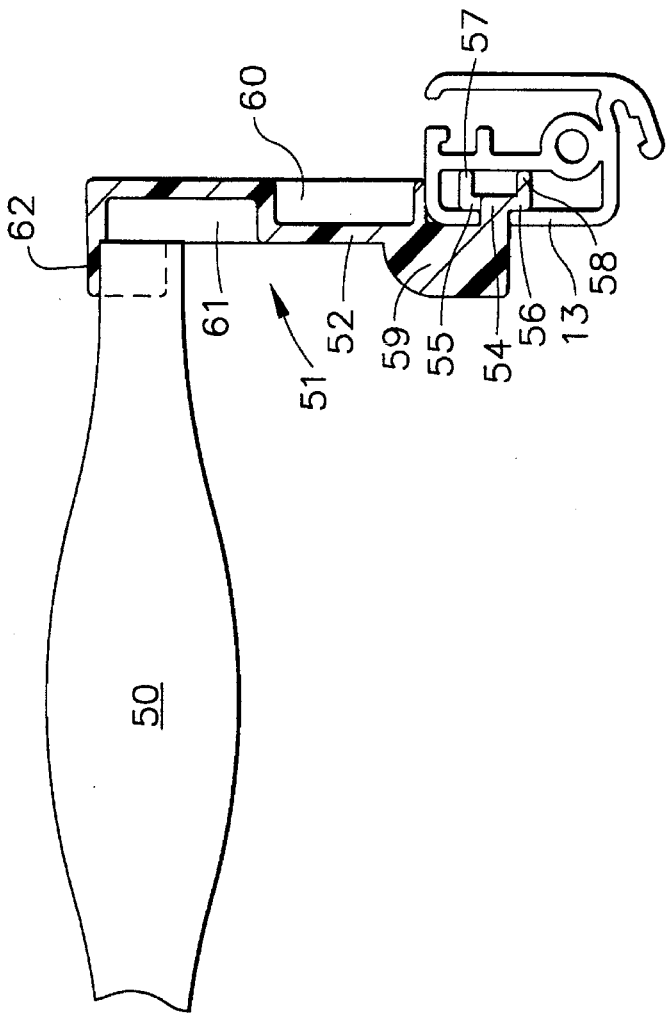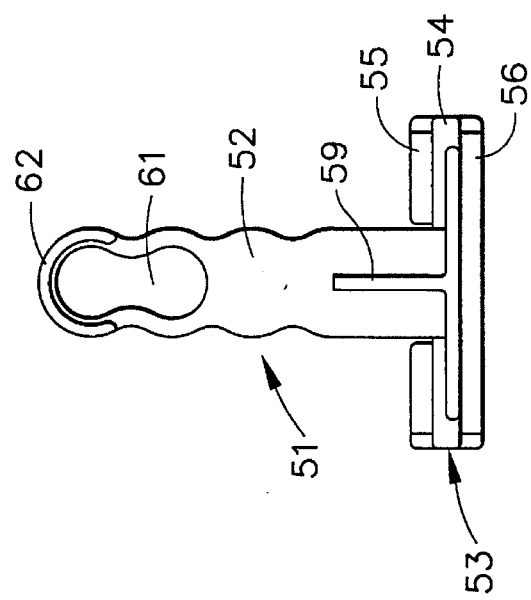

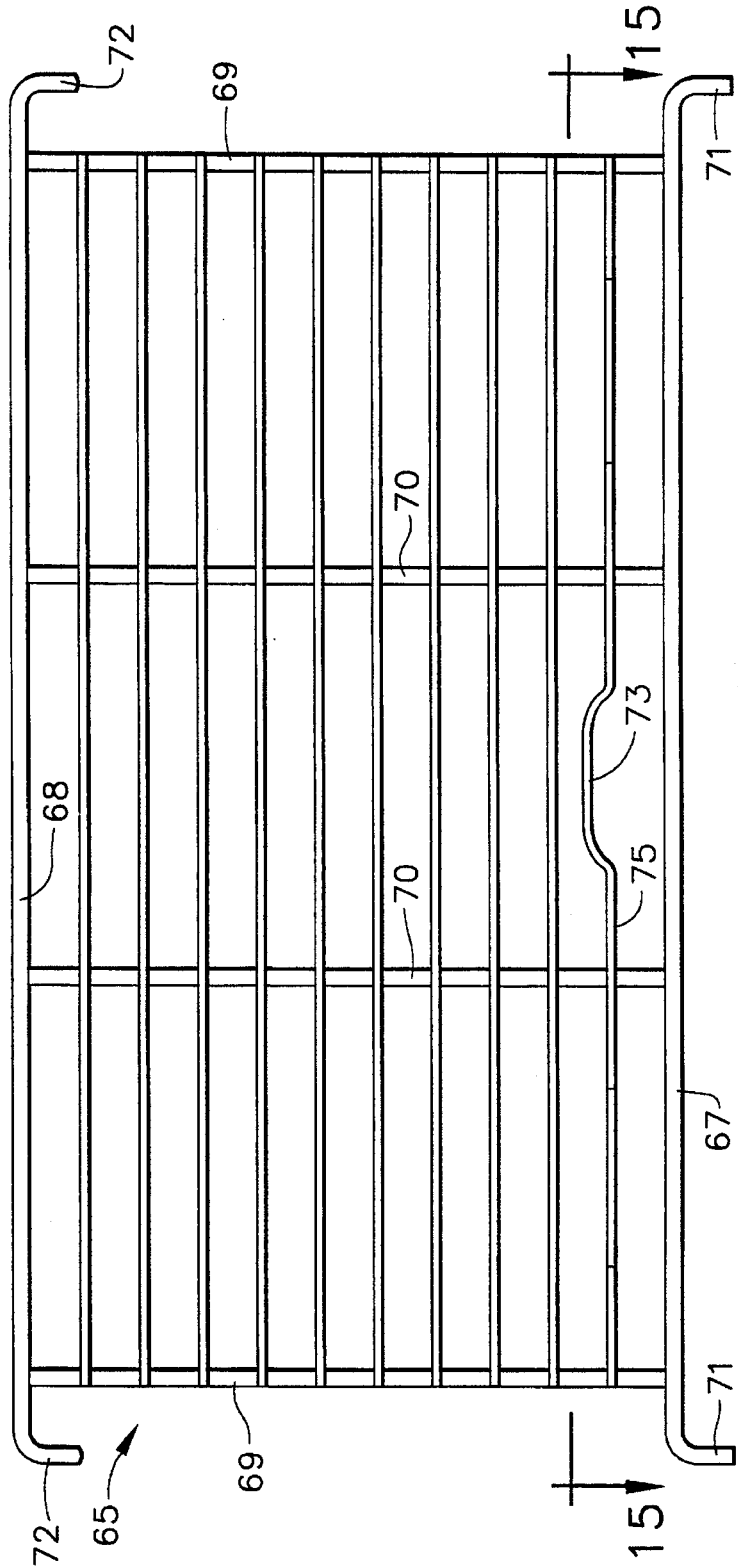
FIG. 14
FIG. 13
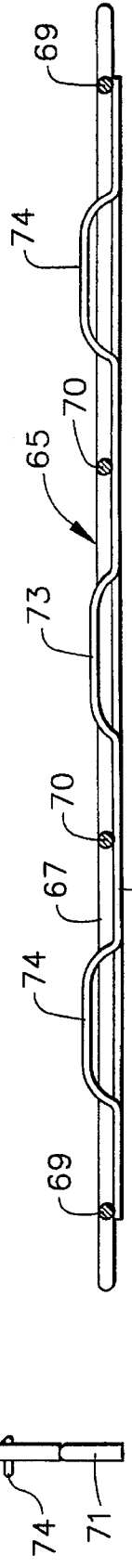
FIG. 15

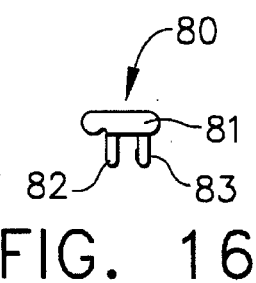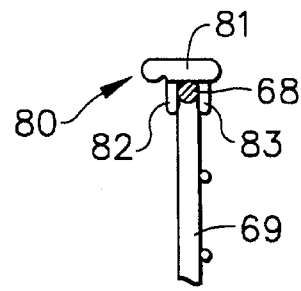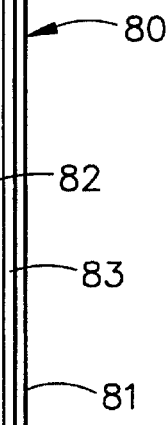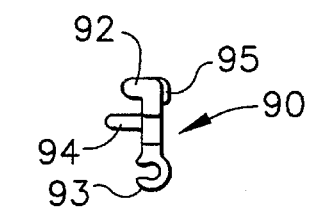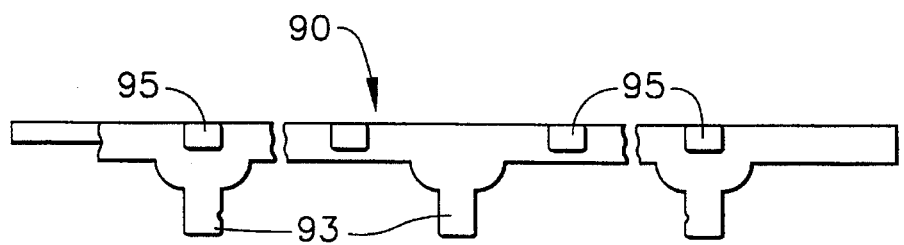

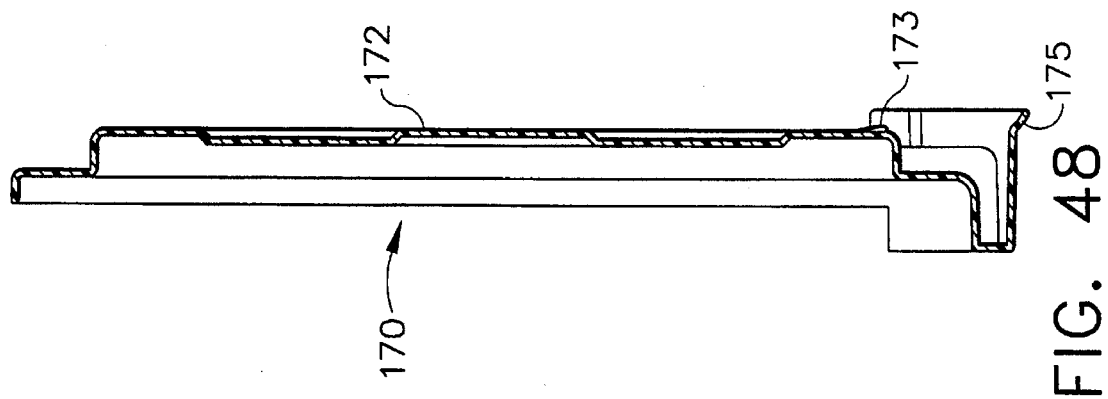
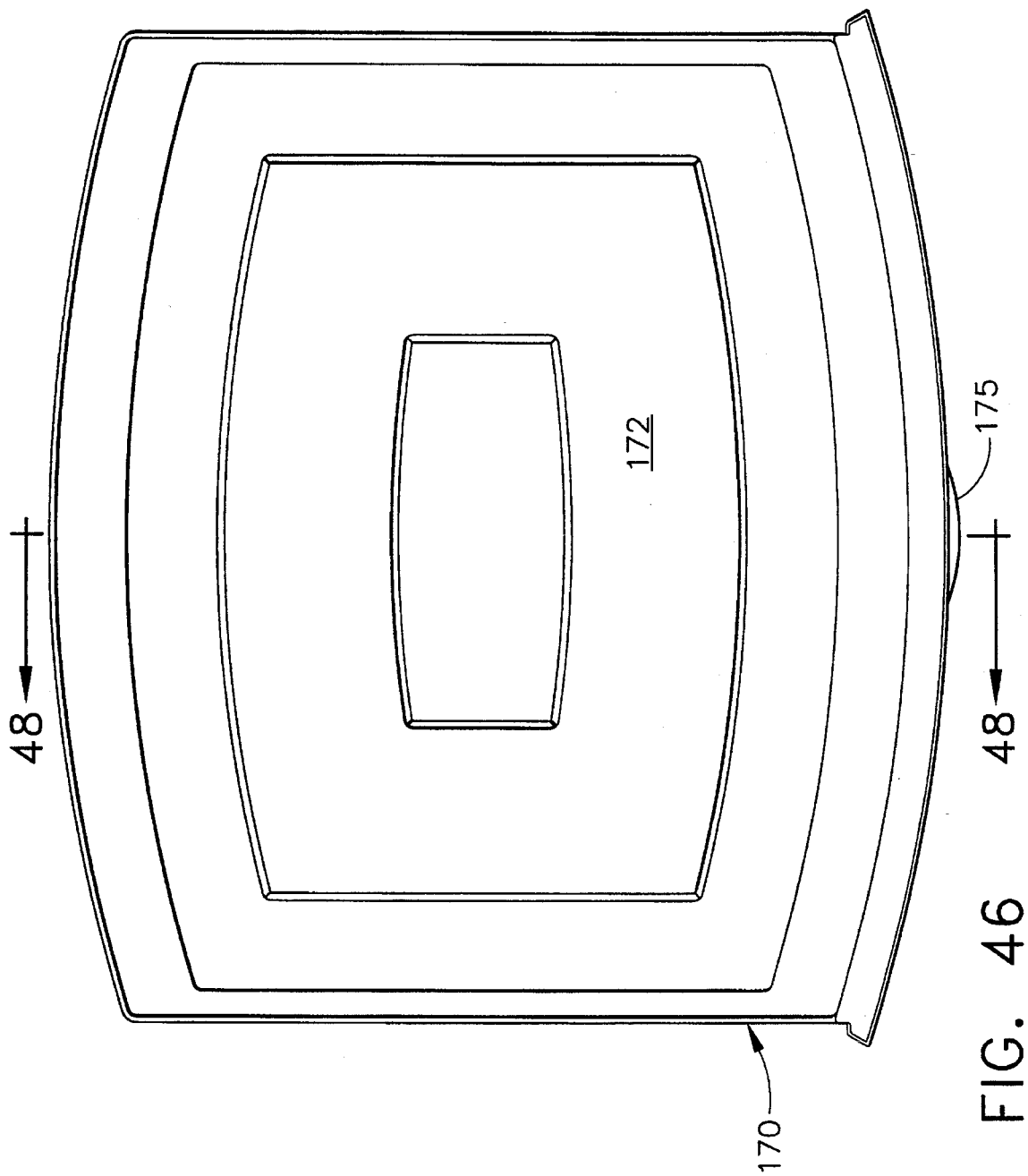

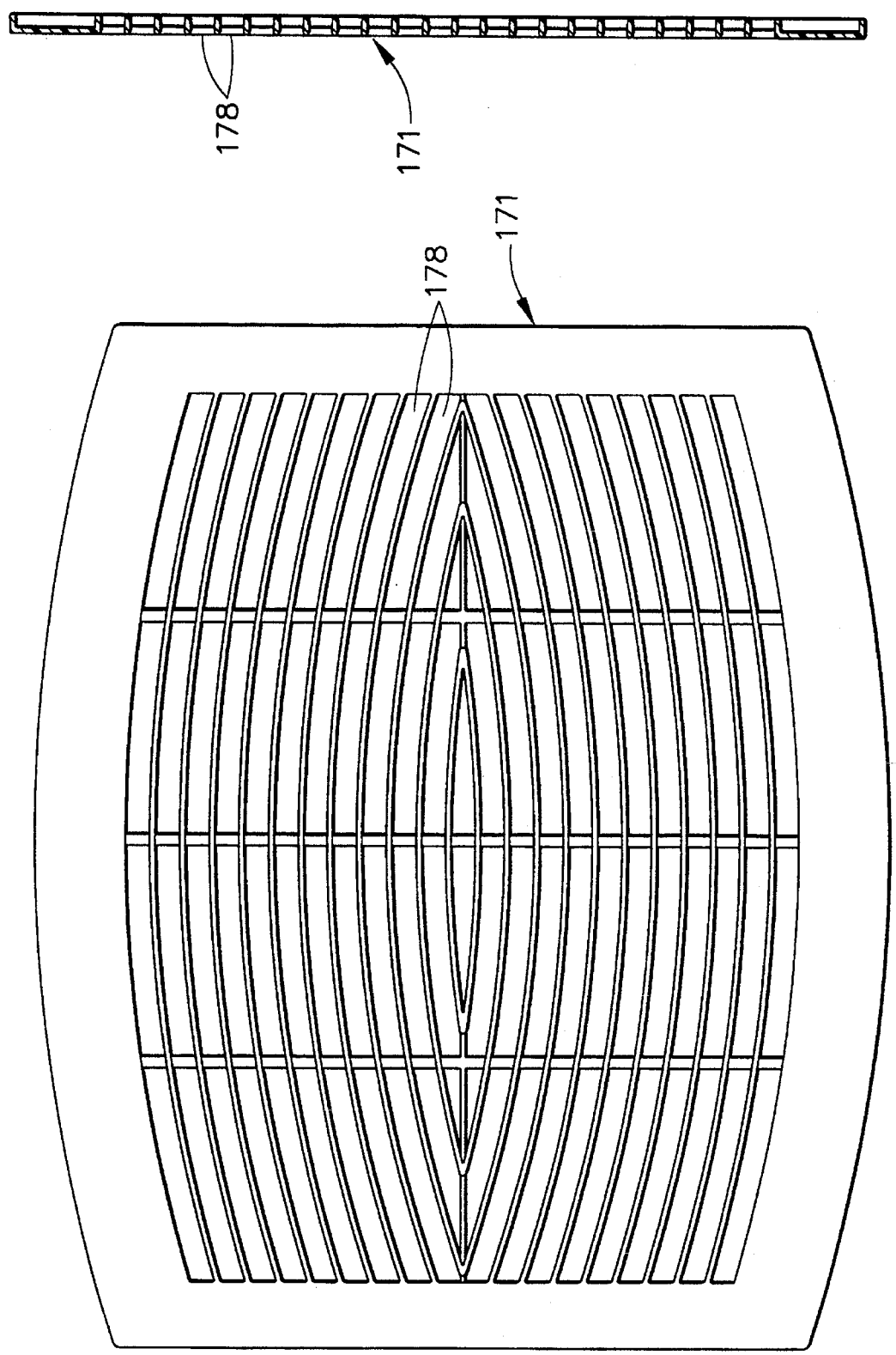

PET HABITAT WITH ENHANCED VIEWING

This invention relates to a pet habitat. More particularly, the invention relates to a pet habitat having a removable substantially clear side wall section which permits an unobstructed view of the habitat's interior.

BACKGROUND OF THE INVENTION

Pet habitats in a residential setting are very popular. The habitats are used to house many small pet animals such as birds, gerbils, hamsters, turtles and reptiles. The habitats or as more commonly called, cages are sometimes constructed to accommodate the animal in as natural a setting as possible.

Bird cages in particular are very prevalent. They have been used in a residential setting for many years. The cages have typically been used to house certain birds because of their beauty or because of their pleasant song and chirping sound. While it is necessary that the cages contain the birds, it is very desirable they allow a viewing of the birds in the best possible manner.

Although the keeping of birds in cages has been done for many years and by many people, the cages commercially available have changed very little over the years. They all have a flat base and a set of closely spaced wires or the equivalent which extend upwardly from the base to form an enclosure. Different enclosure shapes and varying wire configurations have been commercialized. However, the basic bird cage design which is currently available is remarkably similar to that available hundreds of years ago.

A rather basic drawback to the known bird cage design is that the interior of the cage must be viewed through the rather narrow openings between sets of wires. A full unobstructed viewing of the bird inside the cage is never available. In effect, the full beauty of the caged bird simply cannot be enjoyed. While a cage with glass walls would seemingly be ideal, it soon becomes readily apparent that such a cage is not practical. One reason is because the glass becomes dirty. Cleaning inside the cage by normal methods is hampered by the bird's presence and by the need to reach into a small enclosure to do the necessary hand cleaning manipulations. Any enhanced viewing of the cage's interior is more than offset by the constant and arduous task of cleaning to retain the enhanced viewing.

Another drawback shared by known bird cages is the unsightliness of bird droppings on the cage floor and the unpleasant task of having to periodically clean the floor. Old newspapers or some other paper is often used to line the floor. This makes the task of cleaning easier, but does not eliminate the sight of the bird droppings. Still other secondary features of bird cages such as feeding and water containers, perches, and hanging means are design areas where improvement is desired.

It is apparent to many pet owners and particularly pet bird owners that an improved habitat is needed. The conventional pet habitats are very functional, but suffer many disadvantages that should be improved. Particularly needed is a bird cage which offers an unobstructed viewing benefit of the interior of the cage. Ease of retaining that clear unobstructed viewing is also needed. In accord with a long felt need, there has been developed a pet habitat wherein unobstructed viewing and ease of cleaning are designed into the habitat at a reasonable cost.

SUMMARY OF THE INVENTION

A pet habitat for housing at least one pet animal comprises a base member, at least two substantially vertical posts secured to the base member, a side wall barrier and a top member dimensioned to fit onto the posts and secured thereto. The side wall barrier is formed from at least one substantially clear side wall section removably mounted on adjacent vertical posts and, in preferred embodiments for certain pet animals, at least one wire frame side wall section mounted on adjacent posts. The clear side wall and wire frame side wall sections collectively form the side wall barrier. The removably mounted clear side wall section allows an unobstructed viewing of the interior of the habitat. It is readily removed and cleaned when needed such that the enhanced viewing provided by it is maintained with a minimum of effort.

BRIEF DESCRIPTION OF THE DRAWINGS

FIG. 2 is a top view of a base member used in the pet habitat of FIG. 1.

FIG. 3 is a side view in section of the base member of FIG. 2 taken along line 3—3 thereof.

FIG. 4 is a bottom view of the base member of FIG. 2.

FIG. 5 is a side view of the base member of FIG. 4 taken along line 5—5 thereof.

FIG. 6 is a front view in section of the base member of FIG. 2 taken along line 6—6 thereof.

FIG. 7 is a top view of a post used in the pet habitat of FIG. 1.

FIG. 8 is an enlarged view partly in section of a corner of the base member of the pet habitat showing attachment of the post to the base member.

FIG. 9 is a top view of an electric cord plug used in the pet habitat of FIG. 1.

FIG. 10 is an end view of the electric cord plug of FIG. 9 taken along line 10—10 thereof.

FIG. 11 is a front view of an inside of a holder for a bird perch used in the pet habitat of FIG. 1.

FIG. 12 is a top view partially in section of the post of FIG. 7 and the holder of FIG. 11 showing their assembly.

FIG. 13 is a side view of a stationary segment of a wire frame side wall section used in the pet habitat of FIG. 1.

FIG. 14 is a front view of the stationary segment of FIG. 13.

FIG. 15 is a top view in section of the stationary segment of FIG. 14 taken along line 15—15 thereof.

FIG. 16 is a side view of a threshold perch for the top of the stationary segment of the wire frame side wall section of FIG. 14.

FIG. 17 is a bottom view of the threshold perch of FIG. 16.

FIG. 18 is a side view partially in section showing the positioning of the threshold perch of FIG. 16 onto the top of the stationary segment of the wire frame side wall section of FIG. 14.

FIG. 19 is a top view of a hinge rod for use in the post of FIG. 7.

FIG. 20 is a front view of the hinge rod of FIG. 19.

FIG. 30 is an inside bottom view of a light housing used with the pet habitat of FIG. 1.

FIG. 46 is a top view of a clean-out drawer used in the base member of the pet habitat of FIG. 1.

FIG. 48 is a side view taken in section of the clean-out drawer of FIG. 46 along line 48—48 thereof.

FIG. 49 is a top view of a louvered floor grate for the pet habitat of FIG. 1.

FIG. 51 is a side view section of the louvered floor grate of FIG. 49.

DETAILED DESCRIPTION OF THE INVENTION

The pet habitats of the invention are primarily intended for residential use. While all manner of small animals can be housed in the pet habitats, one of the most prevalent caged pet animals is a bird. The pet habitat as a bird cage is of most interest for this reason and is described in detail. Generally, such cages house from one to four birds and the cages are often small enough for a person to lift and move about as needed or desired. The bird cage described in the following paragraphs and with reference to the drawings is typically sized, e.g. it encloses a space of up to about four cubic feet. However, the invention is amendable to larger cages and such cages are contemplated.

Figure 1:
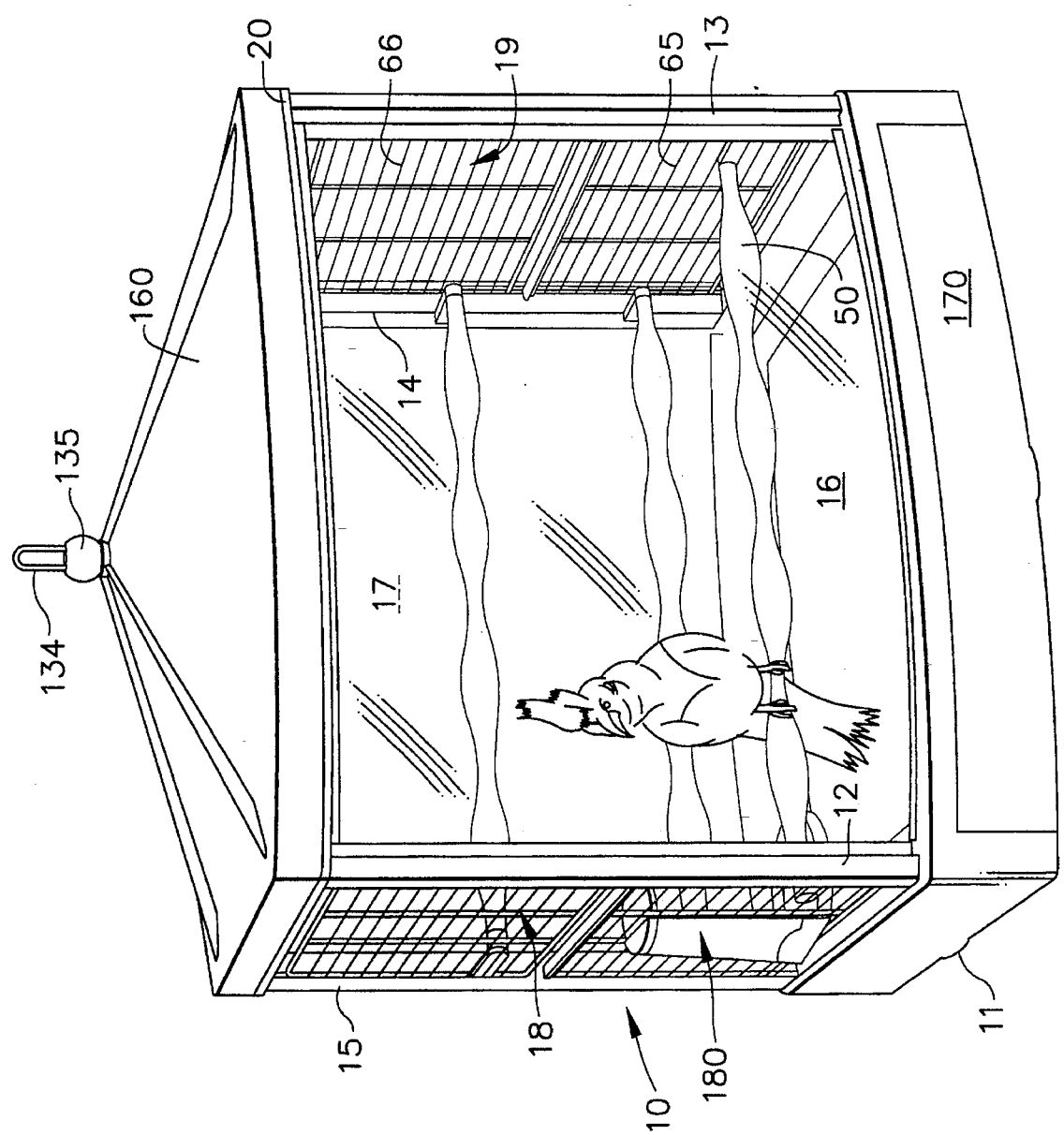
FIG. 1 is an environmental view of the pet habitat of the invention particularly suited for housing a bird.

With reference to FIG. 1, there is shown a bird cage 10 of the invention housing a single bird. The bird cage comprises a base member 11, four substantially vertical posts 12–15, a side wall barrier formed from two opposed substantially clear side wall sections 16 and 17 and two opposed wire frame side wall sections 18 and 19, and a top member 20. As readily apparent, the bird cage 10 allows an unobstructed viewing of the interior of the cage through either of the two clear side wall sections 16 or 17. A detailed discussion of the individual components of the bird cage 10 and their interactions follow.

The base member 11 of the bird cage 10 has a substantially flat bottom surface and upright side walls which extend therefrom to form an open-top compartment. The base member 11 is generally rectangular-shaped. It should be understood other base member shapes are feasible, including but not limited to triangular-shaped, square-shaped, hexagonal-shaped and octagonal-shaped. Circular-shaped and oval-shaped base members are also feasible. Preferably, the base member has from three to eight sides with the illustrated four side rectangular-shaped base member 11 being highly preferred for appearance and functional purposes.

Figure 47:
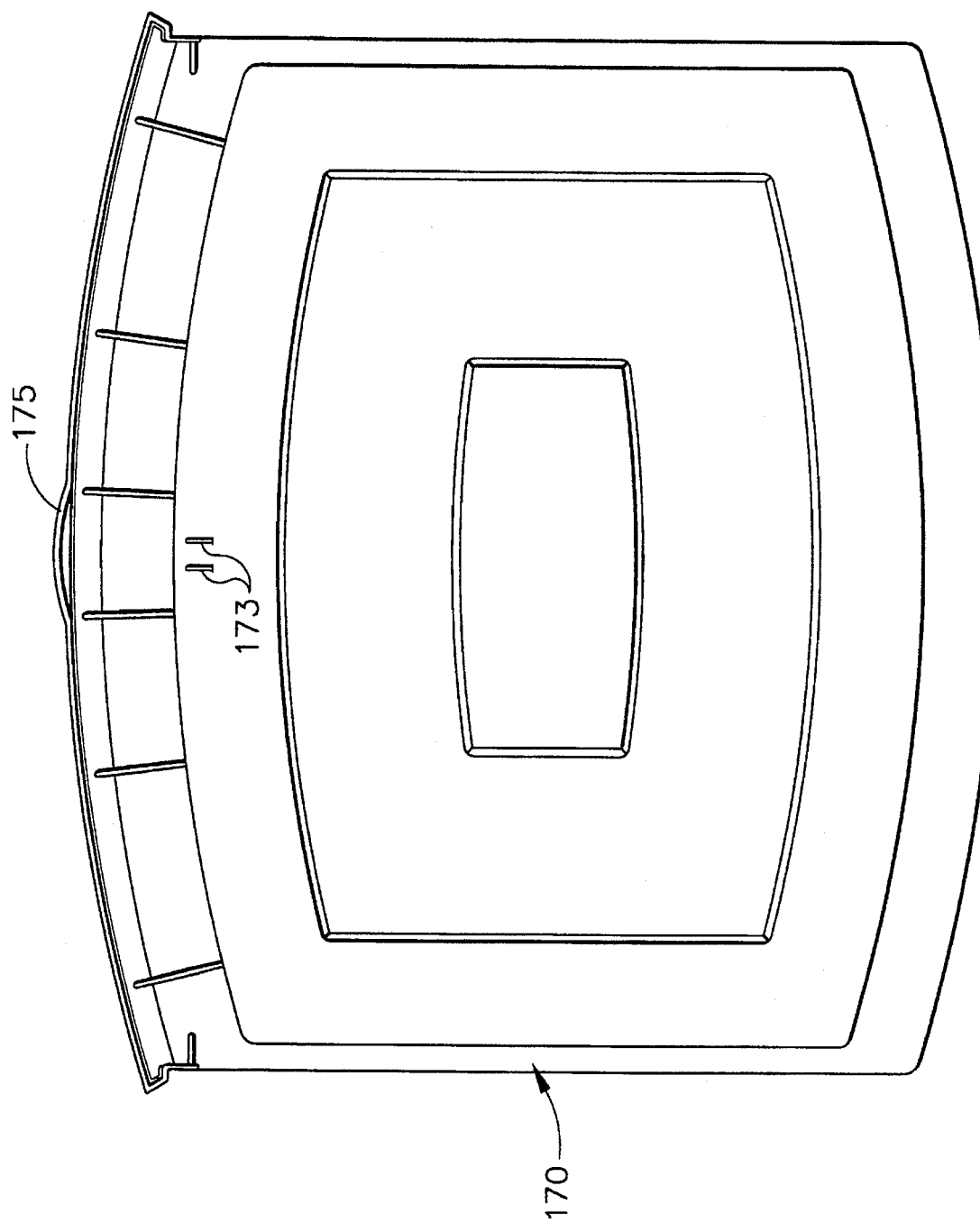
FIG. 47 is a bottom view of the clean-out drawer of FIG. 46.

As most evident in FIGS. 2–6, the base member 11 is an open-top compartment. The bottom surface 21 has grid holes 26 in it for weight reduction, structural purposes and cost reasons. The longitudinal side walls 22 and 24 are curved and have curved retainer ridges 27 to aid in holding the clear side wall sections. The lateral inner side walls 23 and 25 have protrusions 28 which serve as handles. The interior of the compartment has a dead space at its bottom for storage of paper tray liners (not shown). The compartment also has two sets of ledges in the lateral inner side walls 23 and 25. The lower set of ledges 29 is to slidably receive a clean-out drawer (illustrated in FIGS. 46–48) while the upper set of ledges 30 is to slidably receive a louvered floor grate (illustrated in FIGS. 49–51). A set of retaining ramps 31 are located on the upper set of ledges 30 near a far edge to add a child-resistant feature to the bird cage. The retaining ramps prevent an inadvertent removal of the louvered floor grate when the clean-out drawer is removed for cleaning. The clean-out drawer and the louvered floor grate are optional and are described in more detail below.

The base member 11 also has attachment means for the vertical posts. Preferably, post cavities 32–35 are located at spaced intervals near the base member's perimeter. As shown, the base member 11 has four post cavities. A post cavity is located at the intersection of each adjoining side wall and is molded into a top surface of the side walls 22–25. As best seen in FIG. 2, each post cavity is generally rectangular-shaped with an offset 36 and stop tabs 37 and 38 to accommodate the vertical posts. The post cavities 32–35 are sufficiently deep to add structural stability to the posts. Each cavity readily receives a post and retains it until a fastener such as a screw can be inserted in a fastener hole 39 in the cavity's bottom wall and fastened into the post. Less preferably, the cavities can have a much deeper depth, up to that of the base member's overall height. A cord plug hole 40 is provided in the post cavity 31 for reasons discussed below.

Substantially vertical posts 12–15 are positioned in each of the post cavities 32–35 and are secured thereto. Each of the posts is elongated with a generally rectangular cross section so as to snugly fit into the post cavities. With reference to FIGS. 1, 7 and 8, the post 13 is an extruded piece having an angled ledge 41 to form a channel 42 which is used to receive one edge of a substantially clear side wall section. The post 13 also has a first slot 43 to accommodate one edge of a wire frame side wall section. The post 13 has a vertically extending post fastener hole 44 in a bottom surface so as to be secured to the base member after positioning into the cavity 33, as most evident in FIG. 8. The fastener hole can extend to a top surface where it is used for securing the top member 20 to the post 13 as discussed further below. The angled ledge 41 extends off a first face wall of the post and therealong. It extends substantially the full length of the post. It is angled at about twenty degrees to best receive and hold the clear side wall section in a bowed-shape. A recess 45 in the angled ledge 41 is merely to maintain a more uniform wall thickness for manufacturing reasons.

The vertical post 13 has two slots extending its length. The first slot 43 is in a third face wall of the post which is opposite the first face wall with its angled ledge 41 and channel 42. The channel 42 and first slot 43 are positioned to hold wall sections at appropriate angles to one another as dictated by the rectangular-shaped base member and its substantially right angle sides. A second slot 46 is in a fourth face wall of the post adjacent the third face wall and at a right angle to the first face wall. Its purpose is to slidably receive a perch holder as discussed with reference to FIGS. 11 and 12. A center wall 47 extends the length of the post and effectively acts as a back bone to hold the four face walls of the post together. An internal rib 48 extends the full length of the center wall 47 and acts to guide components of the wire frame side wall section. An internal channel 49 extending the full length of the post is provided to create a passageway for an electric cord in an embodiment of the invention discussed below.

Each of the substantially vertical posts is positioned into one of the post cavities of the base member. A screw fastener extending through the hole in the post cavity and up into the screw hole of the post semi-permanently holds the posts to the base member. The cavities and posts are shaped in such a way that it is only possible to place the posts in the proper orientation. In effect, adjacent posts have angled channels facing towards one another to receive a left edge and a right edge of the clear side wall section. Similarly, the first slots of adjacent posts are facing inwardly towards each other to receive a left edge and a right edge of wire frame side wall section components.

Figure 52:
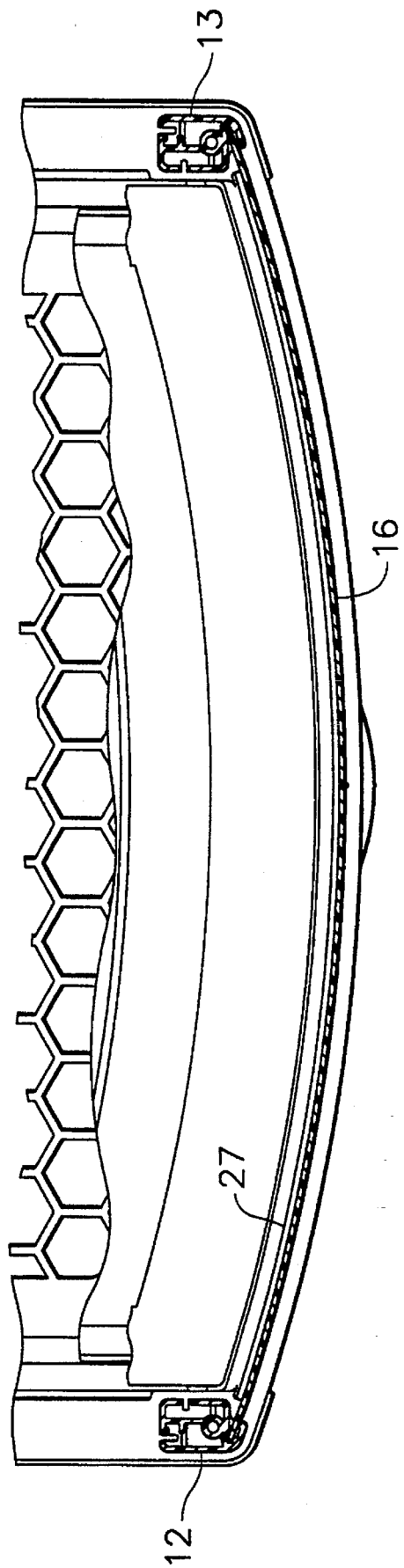
FIG. 52 is a partial top view of the pet habitat of FIG. 1 taken in section showing a positioning of a clear side wall section into adjacent posts.
Figure 53:
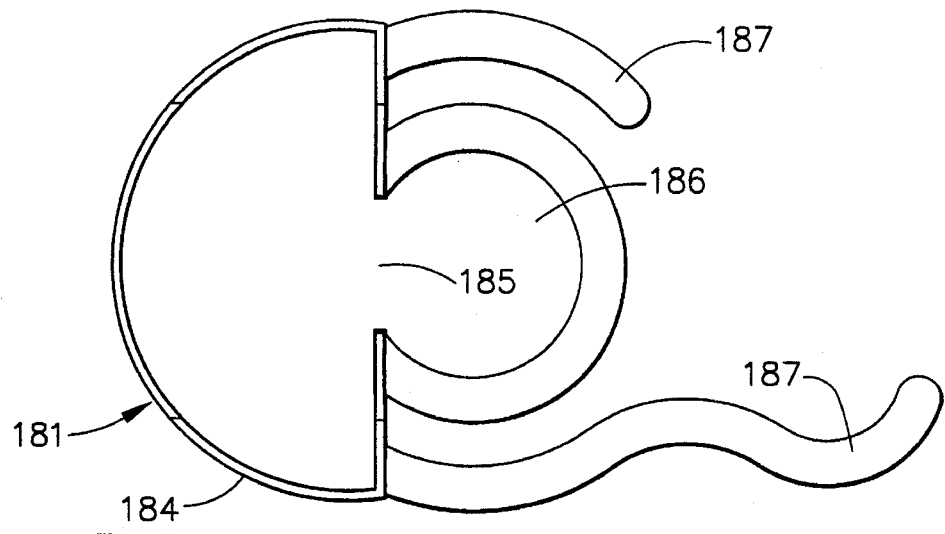
FIG. 53 is a top view of a base used with a free-flow feeder assembly used on the pet habitat of FIG. 1.
Figure 54:
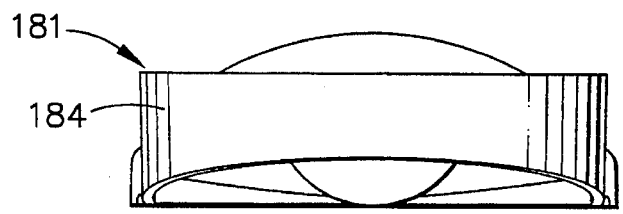
FIG. 54 is a back view of the base of FIG. 53.
Figure 55:
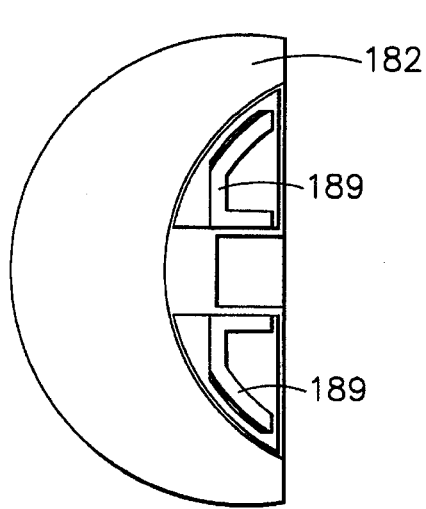
FIG. 55 is a top view of a container of the feeder assembly of FIG. 1.
Figure 56:
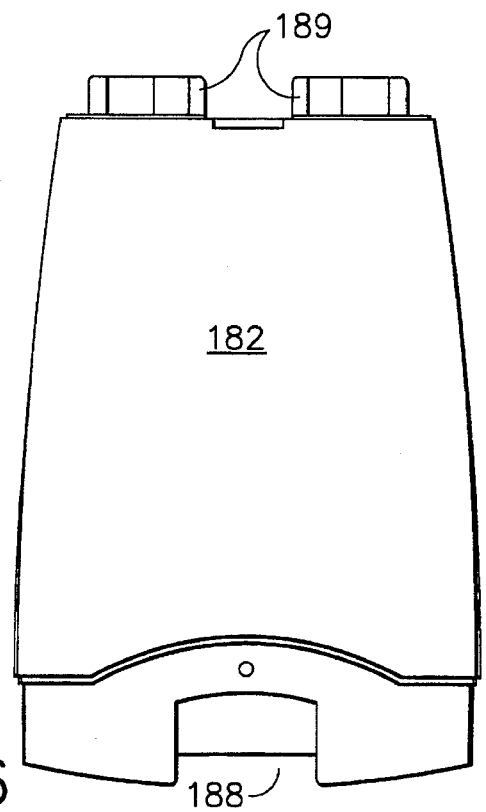
FIG. 56 is a front view of the container of FIG. 55.
Figure 57:
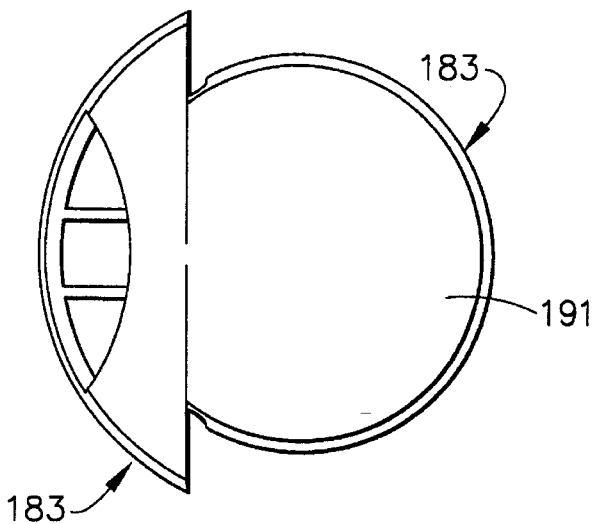
FIG. 57 is a top view of a cap of the feeder assembly of FIG. 1.
Figure 58:
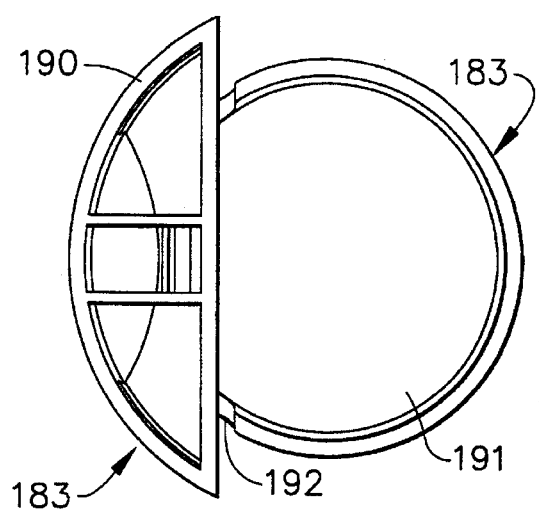
FIG. 58 is a bottom view of the cap of FIG. 57.
Figure 59:
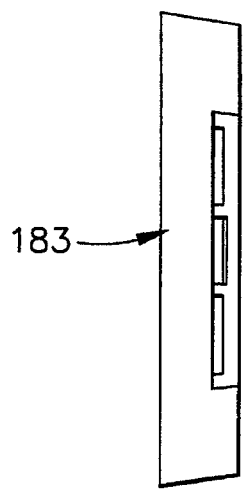
FIG. 59 is a back view of the cap of FIG. 57.

A substantially clear side wall section is removably mounted on adjacent vertical posts. Separate attachment means such as screws are not needed because of the vertical posts configuration and the flexible nature of the clear side wall section. A single clear side wall section is used or clear side wall sections are mounted on each set of adjacent vertical posts. In the latter case, air openings (not shown) may be provided in one or more of the clear side wall sections if desired. A flexible polymeric resin is preferably used to form the clear wall section. Plexiglas is a commercially available and preferably used sheet material. Its flexible nature is conducive to readily removing it from the angled ledges of the adjacent posts. A finger hole (not shown) near one vertical edge aids in removing and reinstalling it. FIG. 52 illustrates the positioning of the clear side wall section 16 in adjacent posts 12 and 13 and how the section edges interact with the angled ledges to get a tight rattle-free mounting. A spring fit holds it in place. Grasping the clear wall section and bending it outwardly is sufficient to free it from the posts. It is readily removed and readily installed. The bowed nature of the clear side wall section 16 after mounted in the channels of the posts adds to its removable mounting feature. The resultant curved surface helps to reduce glare which makes viewing even better and also provides a stiffer panel.

An optional feature of the invention which is included in the bird cage 10 of FIG. 1 is three perches and their perch holders at each terminus thereof. As evident in FIG. 1, three perches 50 extend the longitudinal length of the cage's interior. The perches 50 are generally rounded and have varying diameters to best simulate a tree branch thereby reducing the likelihood of injury to the bird's feet and/or to accommodate different birds. The six perch holders are the same in construction. Each is configured at one end to slidably fit into the second slot of one of the vertical posts and at another end to receive and hold one end of the perch.

With reference to FIGS. 11 and 12, the perch holder 51 has a leg 52 with a sufficient length that the perch is comfortably distanced from a side wall. Generally, the leg 52 is about one to six inches long. A first end has a rail 53 extending at a right angle from the leg 52 in both directions. The rail 53 has a narrowed neck 54 which is dimensioned to fit into the second slot 46 of the post. The rail 53 also has cross legs 55 and 56 which extend at right angles from the neck 54 so as to hold the rail within the post once properly positioned and two legs 57 and 58 which extend at right angles from the cross legs and run parallel to the neck 54. The two legs 57 and 58 have a length such that they contact the center wall 47 of the post. The rail once properly positioned in the slot from the top of the post is able to slide along the post for perch height adjustment purposes yet frictionally engages the post in a manner whereby the perch holder and its perch will not move by the bird's weight alone. A finger tab 59 extending from the rail partially along the leg is used for grasping by the bird owner for height adjusting purposes. Hollows 60 and 61 are molded into the leg 52 for weight reduction, material savings and structural reasons.

The second end of the perch holder 51 has a semi-circle perch socket cap 62 extending from an inside of the leg 52 and is to receive the perch's terminus and retain it during use. The open side of the socket cap 62 is used for sliding the perch end into place. The length of perch and the yielding nature of the perch holder leg are coordinated such that the perch is readily installed into the holders without a need for added attachment means, yet is able to remain in place during use by the bird housed in the cage.

FIGS. 13–27 illustrate the wire frame side wall sections 18 and 19 used in the bird cage 10. Each of the side wall sections is comprised of a stationary segment 65 and a door assembly segment 66, vertically disposed one over the other. While the wire frame side wall sections 18 and 19 used in the bird cage 10 have the stationary and door segments, it is feasible that a wire frame side wall be a stationary segment only which has been properly dimensioned to fill the full space between adjacent posts. It moreover could be a door assembly segment only, also properly dimensioned to fill the full space between adjacent posts. However, use of the stationary and door assembly segments in the two wire frame side wall sections 18 and 19 adds a degree of flexibility in use and enjoyment of the bird cage 10 and for these reasons is preferred.

The stationary segment 65 of the wire frame side wall section 19 best seen in FIGS. 13–15 has a grill pattern. A bottom frame cross wire 67 has a length to extend between adjacent vertical posts and into the first slots of adjacent vertical posts 13 and 14. The top frame cross wire 68 also has a length which extends between the adjacent vertical posts and into the first slots. When properly positioned, the vertical frame side wires 69 are next to a face of the posts to form a uniform vertical space and effectively eliminate any escape opening for the bird within the cage. The inner vertical wires 70 are for strengthening purposes. The openings in the grill pattern are sufficiently small that the housed bird cannot pass through them. Preferably, the ends of the bottom frame cross wire 67 are bent to form a right angle to the cross wire. This vertical leg 71 on the bottom cross frame wire is more for appearance purposes to hold the cross wire off the base member so as to maintain a uniform horizontal space between the base member and the wire frame side wall as most evident in FIG. 1. The top frame cross wire 68 also has its ends bent at an approximate right angle downwardly to form vertical legs 72 and further are bent to be laterally offset. The offset ends are to retain the position of the stationary segment in the slots of the adjacent vertical posts and to add more stability to the structure.

Again with reference to FIGS. 14 and 15, one of the inner cross wires 75 is given three offsets. The center wire offset 73 is U-shaped and extends into the cage. However, it is also angled upwardly to permit better feed flow from an auxiliary feeder assembly as described in detail below and with reference to FIGS. 53–67. The side wire offsets 74 are U-shaped and project horizontally into the cage. They are for the purpose of accommodating added feeder and water assemblies. They are not angled upwardly as the center wire offset 73 because, if not used, an opening is created which presents an opportunity for the bird to injure itself or possibly escape.

As seen in FIGS. 16–18, a threshold perch 80 is optionally provided for positioning over the top frame cross wire 68 of the stationary segment 65. The threshold perch 80 is merely to provide a flat top surface for the bird to perch on and also to provide some degree of comfort to the bird owner who periodically reaches into the cage and rests a wrist or forearm on the top surface of the stationary segment. The threshold perch 80 is an elongated flat member 81 with the approximate length of the stationary segment's top frame cross wire 68 within the boundaries of the vertical frame side wires. It has a width of about one-fourth inch to about one inch. It has two retainer ridges 82 and 83 extending from an underside which are spaced apart sufficiently to snugly engage the top frame cross wire 68 as seen in FIG. 18.

Figure 22:
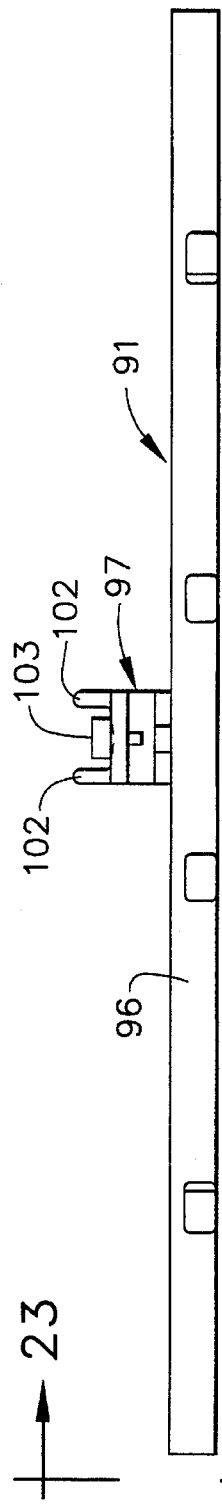
FIG. 22 is a front view of the latch rod of FIG. 21.
Figure 23:
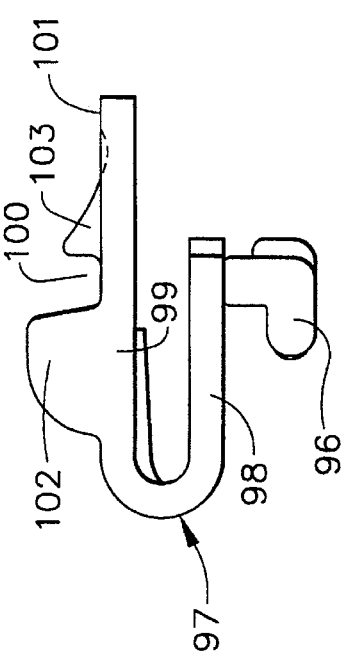
FIG. 23 is a top view of the latch rod of FIG. 22 taken along line 23—23 thereof.
Figure 25:
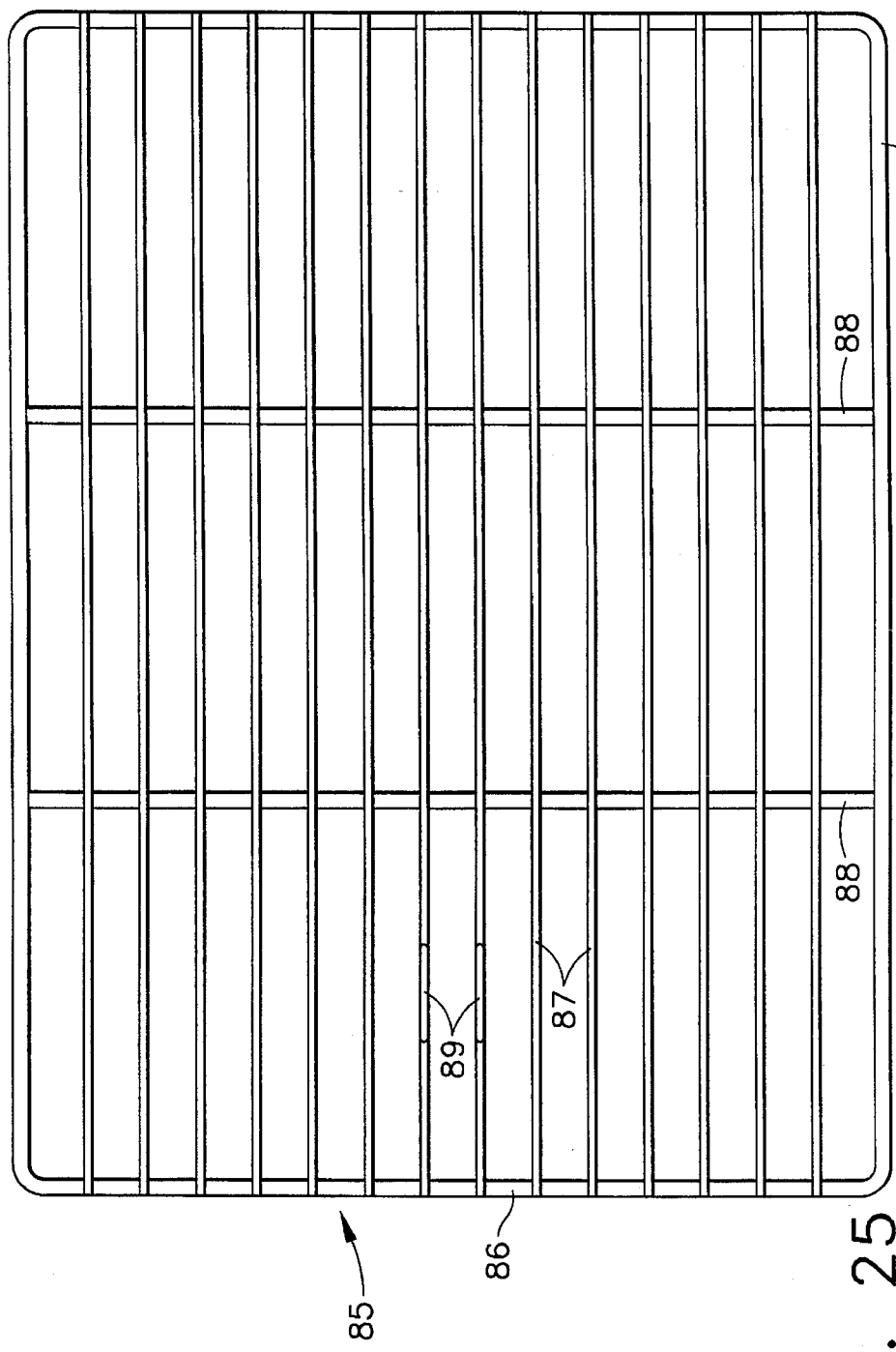
FIG. 25 is a front view of the wire frame door of FIG. 24.
Figure 24:
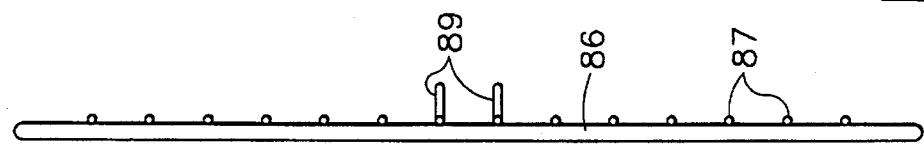
FIG. 24 is a side view of a wire frame door used in the bird cage of FIG. 1.
Figure 26:
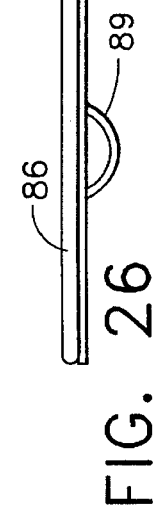
FIG. 26 is a top view of the wire frame door of FIG. 25.
Figure 27:
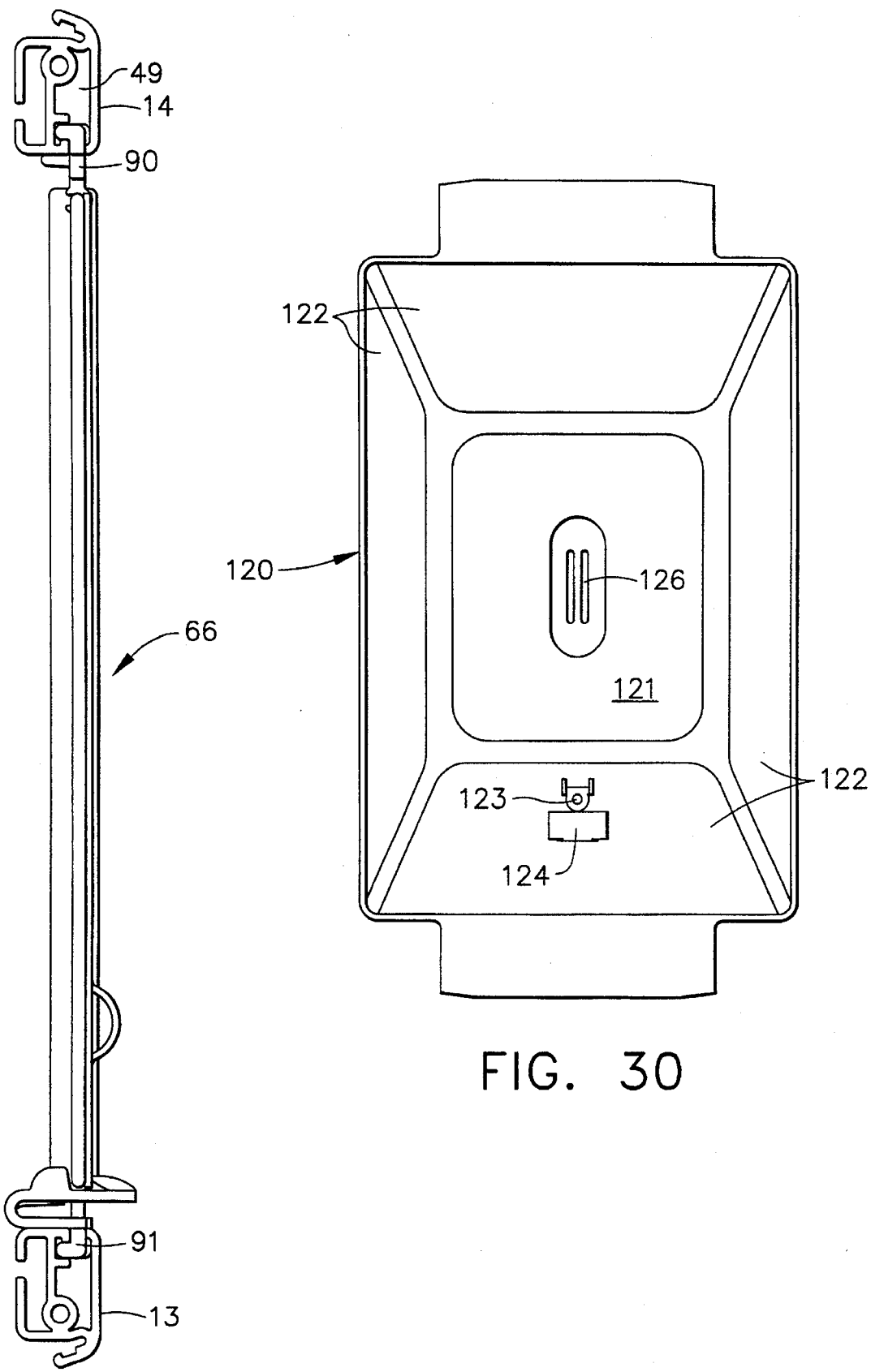
FIG. 27 is a top view of two posts and a wire frame door assembly of the pet habitat of FIG. 1 showing their assembly.

FIGS. 19–27 illustrate the door assembly segment 66 of the wire frame side wall section 19. It is dimensioned to work in conjunction with the stationary segment 65 described above. As seen in FIGS. 24–26, the main component of the door assembly segment 66 is a wire grid door 85. It is rectangular-shaped with a grill pattern. It has a continuous outer frame wire 86, inner cross wires 87 and inner vertical support wires 88. The inner cross wires are horizontal and provide a gripping surface for the bird to use in a climbing exercise. A U-shaped bend to two of the inner cross wires near a latch rod side is used as a finger grip 89 for grasping and pulling the door open. The openings in the grill pattern are sufficiently small that the housed bird cannot slip through and escape or even slip its head through. The width of the wire grid door 85 is sufficient to engage a hinge rod 90 and a latch rod 91, both positioned in the first slot of the adjacent vertical posts 14 and 13, respectively, as best seen in FIG. 27.

The hinge rod 90 shown individually in FIGS. 19 and 20 has a right angle rod 92 which has a size and length to fit into the first slot of the vertical post 14 and extend from the stationary segment's top cross wire to the top of the vertical post. Three hook-like members 93 are spaced along the right angle rod 92 to extend laterally with an opening in each properly positioned to engage a portion of the grid door's outer frame wire and hold it in a fashion which allows the wire grid door 85 to revolve outwardly. One leg of the right angle rod 92 fits into the first slot 43 of the post 14 while a second leg engages the rib 48 of the vertical post. Spaced tabs 94 positioned on arms of the hook-like members and parallel to the second leg of the right angle rod 92 are to engage the face of the vertical post 14 to stabilize the hinge rod 90 in the vertical post. The hinge rod 90 is readily slid into the first slot 43 of the post 14 and once positioned is incapable of itself rotating because of the spaced tabs 94 and rib 48. Spaced filler bumps 95 along the second leg of the right angle rod 92 contact the inside surface of a wall of the post and also tend to stabilize the hinge rod in the vertical post.

Figure 21:
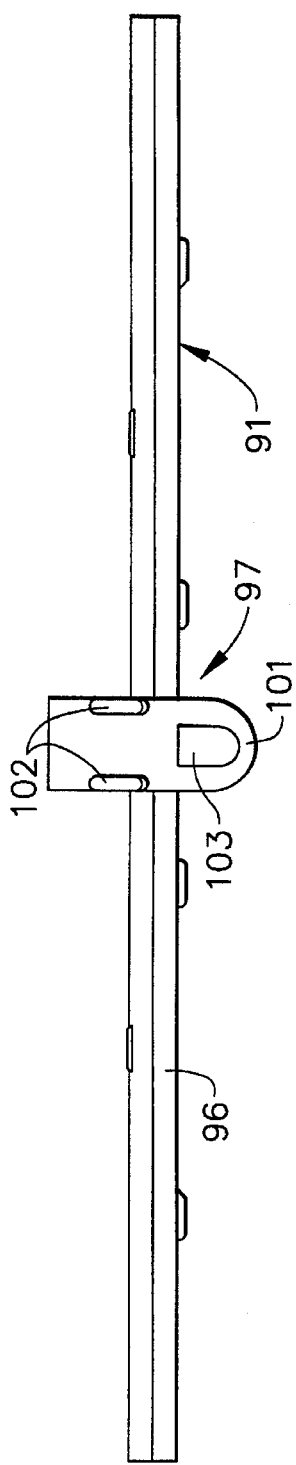
FIG. 21 is a side view of a latch rod for use in the post of FIG. 7.

The latch rod 91, best seen in FIGS. 21–23, also has a length which extends from the stationary segment's top frame cross wire 68 to the top of the vertical post. It has a right angle rod 96 which is dimensioned to slide along the first slot 43 of the vertical post 13, but not rotate. A latch mechanism 97 is positioned 15 preferably at a mid-point thereof. It is generally U-shaped and is permanently attached at an end of one leg 98 to the latch rod. The second leg 99 has a latching notch 100 to engage the outer frame wire 86 of the wire grid door 85 and a finger tab 101 at its very end. The notch 100 is formed by stop tabs 102 extending from the second leg 99 and a hold tab 103. The latch mechanism is yieldable such that the door is trapped in the notch 100, yet bending of the second leg 99 by pushing the finger tab 101 inwardly towards the right angle rod 96 readily releases the door.

While the door assembly segment 66 is illustrated as vertically disposed over the stationary segment 65, it should be understood a reverse disposition of the two segments is possible. Also, while the individual wires in the side wall sections are oriented horizontally, they could as well be oriented vertically. The horizontal cross wires as illustrated and described in detail above are preferred because of the fact they allow the caged bird to climb about the cage more easy.

Figure 28:
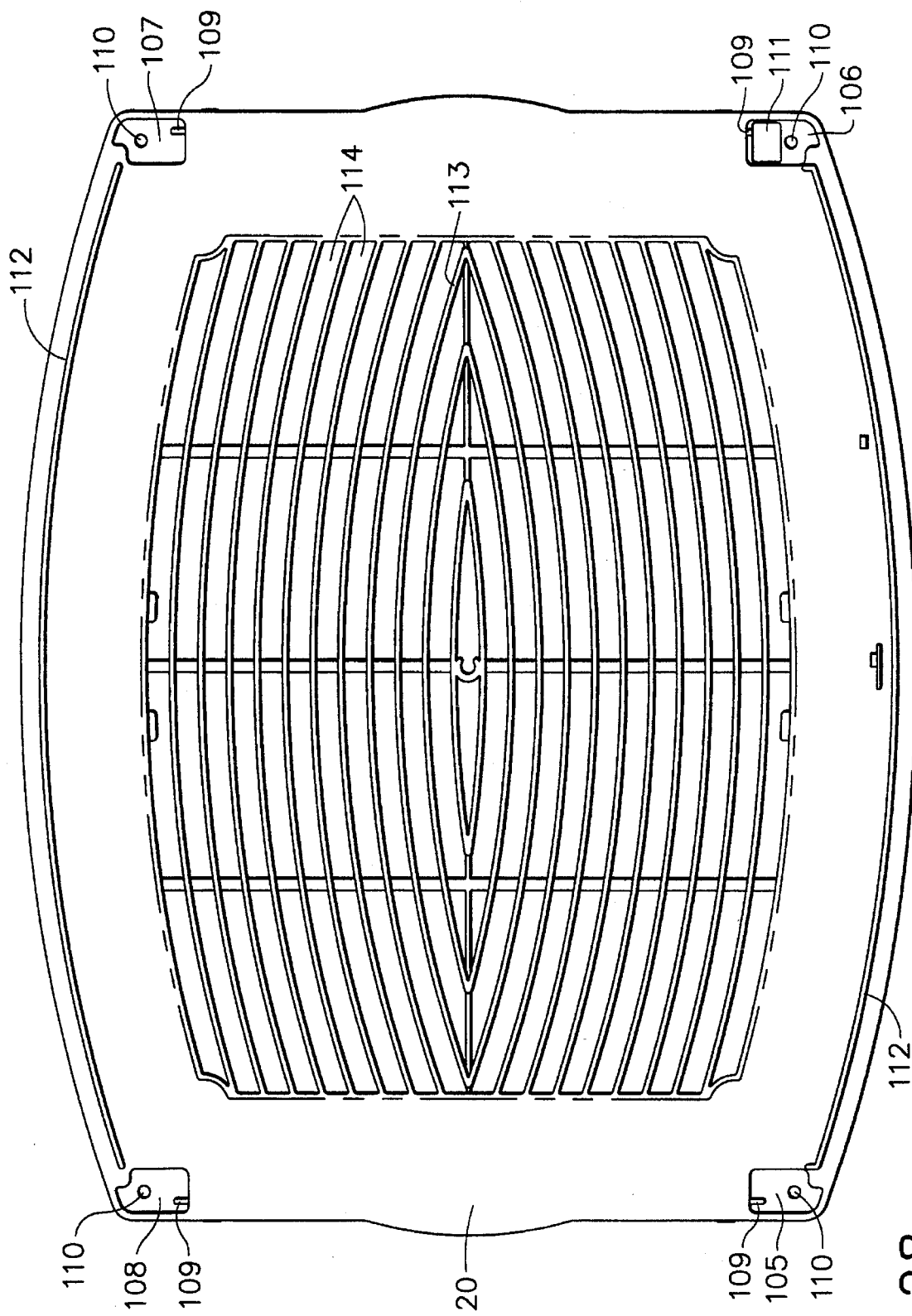
FIG. 28 is a bottom view of a top member forming a part of the pet habitat of FIG. 1.
Figure 29:
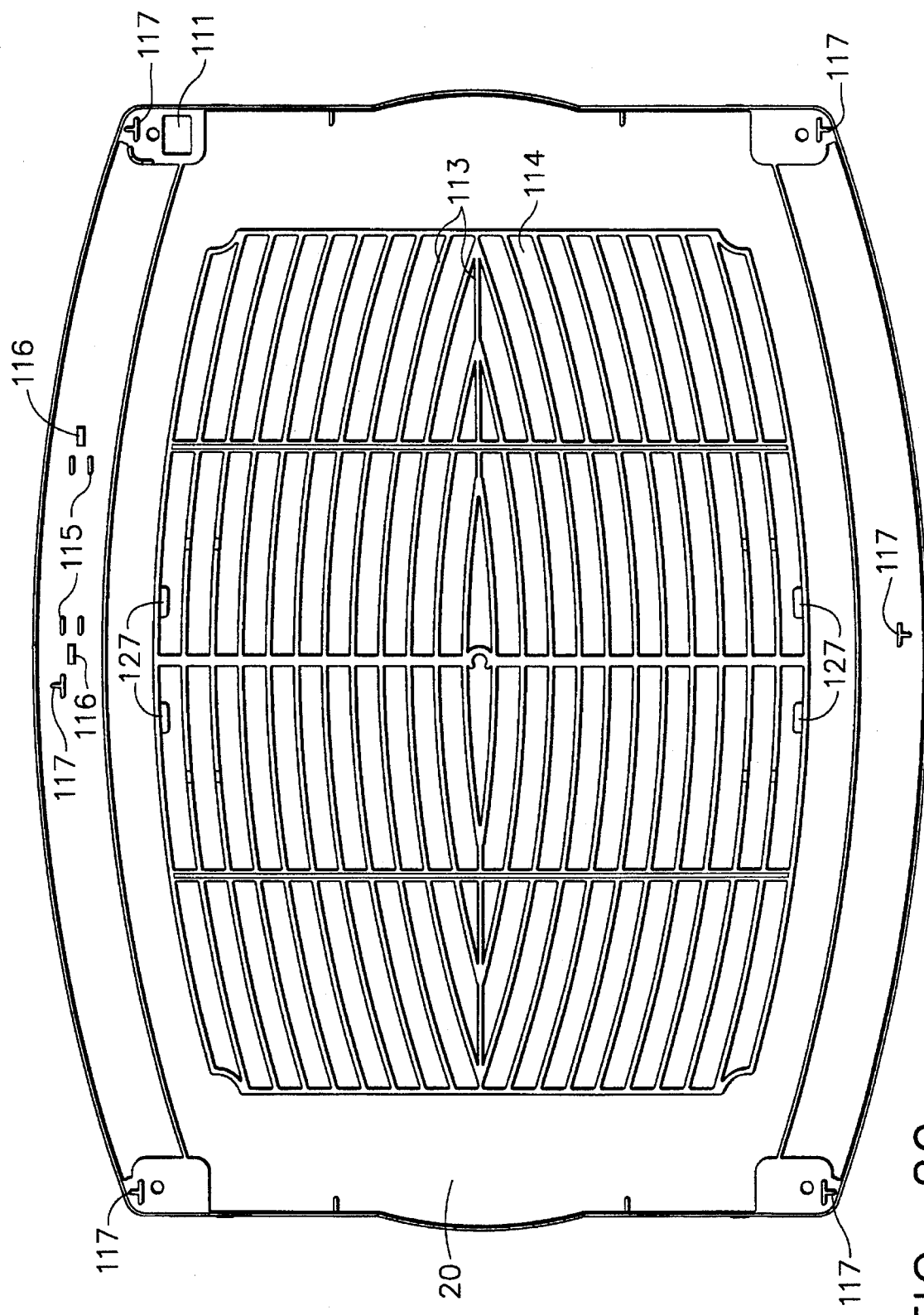
FIG. 29 is a top view of the top member of FIG. 28.
Figure 33:
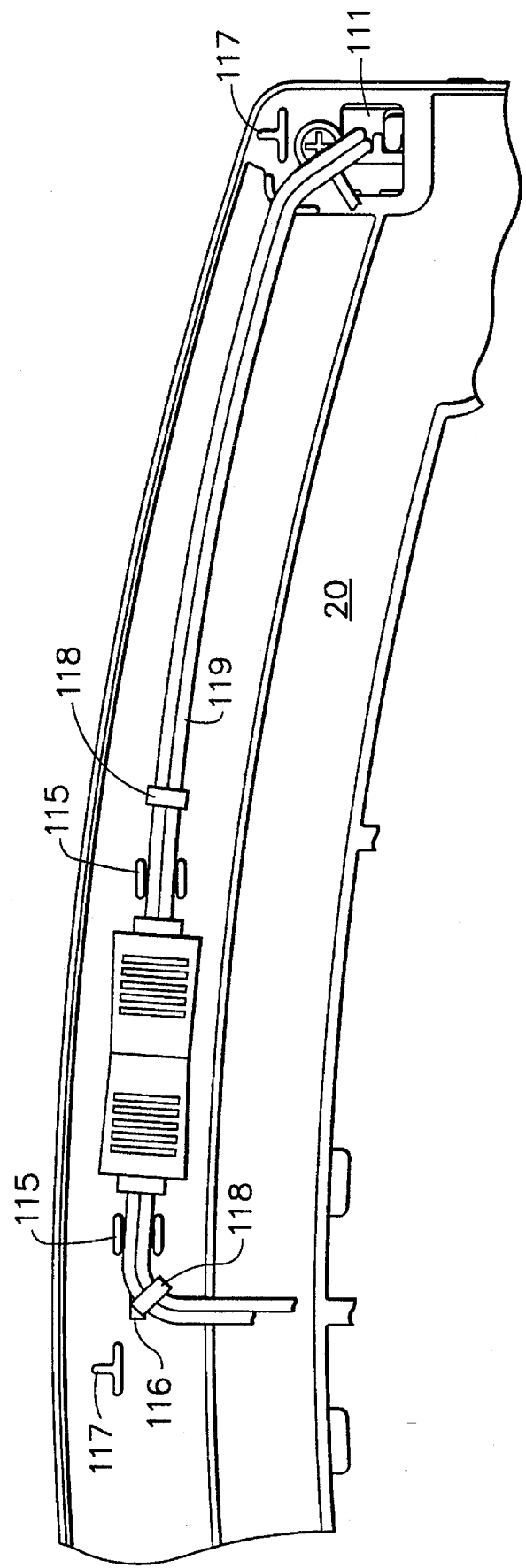
FIG. 33 is an enlarged partial view of the top member of FIG. 32 showing cord retainer tabs, cord fastener straps and an electric cord in position.
Figure 36:
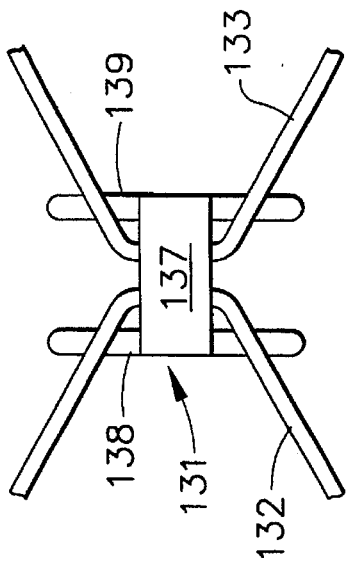
FIG. 36 is an enlarged partial bottom view of an H-shaped retainer clip and V-shaped wires used in the hanger suspension system of FIG. 32.
Figure 34:
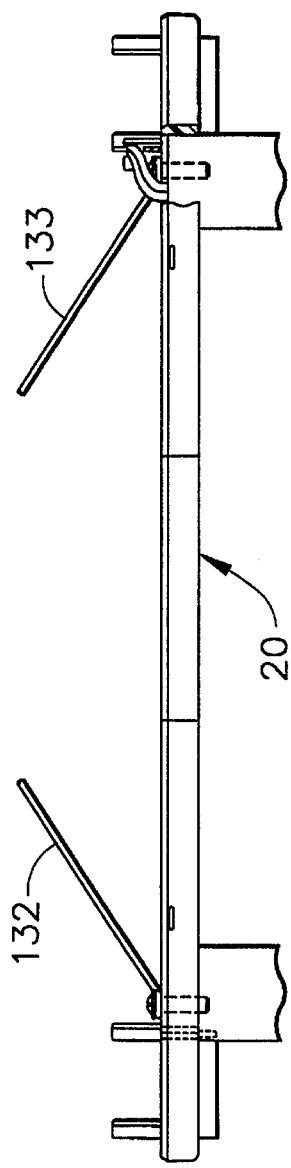
FIG. 34 is a partial side view of a part of the hanger suspension system and the top member of FIG. 32.
Figure 35:
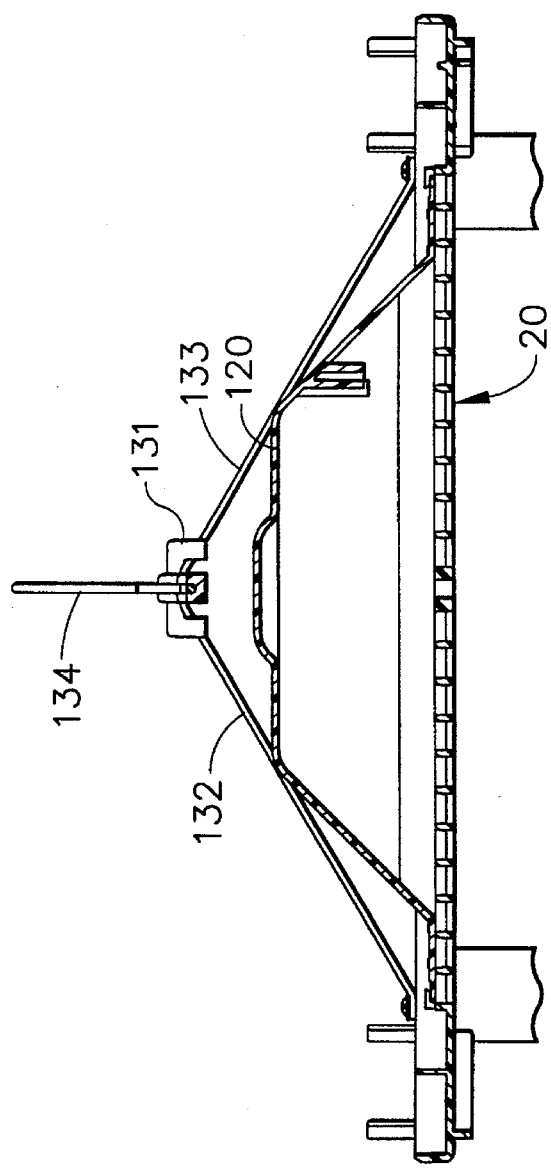
FIG. 35 is a side view partially in section of the top member, the hanger suspension system and a covering showing their interaction.
Figure 37:
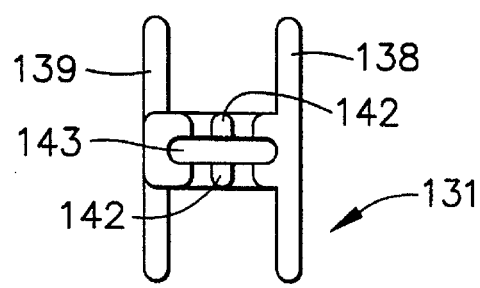
FIG. 37 is a top view of the H-shaped retainer clip of FIG. 36.
Figure 38:
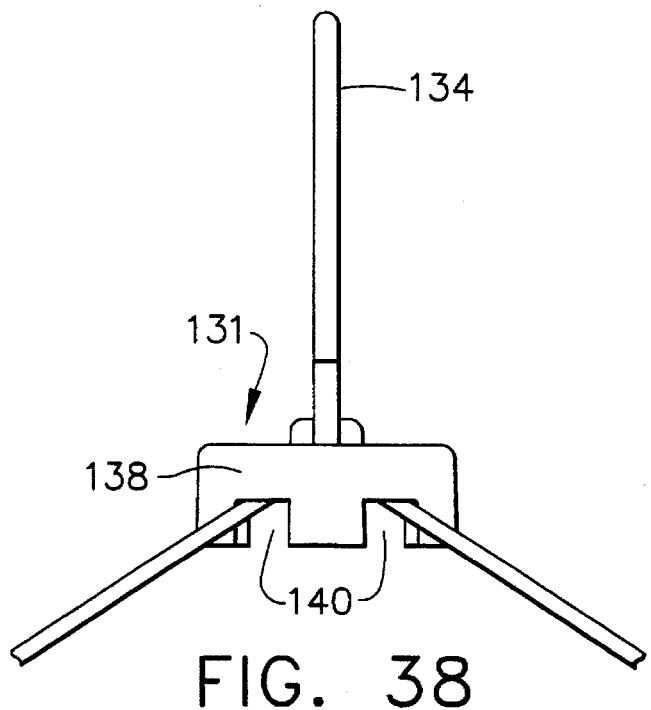
FIG. 38 is a side view of the H-shaped retainer clip and V-shaped wires of FIG. 36.

The top member 20 of the bird cage 10 is illustrated in FIGS. 28, 29 and 33. It is a substantially flat member dimensioned to overlie the vertical posts 12–15 and be secured thereto. It has a shape which approximates that of the base member 11 for appearance purposes and also to form an enclosure with the base member and side wall barrier.

The top member 20 is generally rectangular-shaped with optional post recesses 105, 106, 107 and 108 in each of the four corners as an aid in attaching it to the vertical posts during assembly. The recesses are shaped to receive the vertical post ends. Stop tabs 109 in each post recess aid in positioning of the top member 20 onto the vertical posts 12–15. A fastener hole 110 is located in each recess to align with the fastener hole in the post. A larger cord plug hole 111 is added to one recess 107 to accommodate an electric cord. As seen in FIG. 28, a curved retainer ridge 112 extends along each longitudinal side on the underside of the top member 20 near each side edge. The retainer ridges are used as backing for the bowed clear side wall sections 16 and 17 similar in operation to the retainer ridges 27 found on the base member 11.

The top member 20 also has a louvered center area 113. The openings 114 in the center area serve to vent the cage, but are primarily to allow light to pass through from an illumination means positioned above it and discussed in the next paragraph. Secondarily, the louvered center area is useful for hanging accessories such as perches, ladders and toys. With reference to FIG. 29, a set of spaced cord retainer tabs 115 and cord fastener loops 116 are provided in a top surface of the top member 20 along one side. They are to retain an electric cord and any connecting plugs leading from the post 14 to the illumination means and prevent any accidental disconnection. Spacer posts 117 on each longitudinal side of the top surface near an edge and in each corner are used to hold a covering off the top member. FIG. 33 shows a detailing of the cord retainer tabs 115 and a fastener loop 116 with its attendant cord fastener strap 118 around an electric cord 119 so as to trap it.

Figure 31:
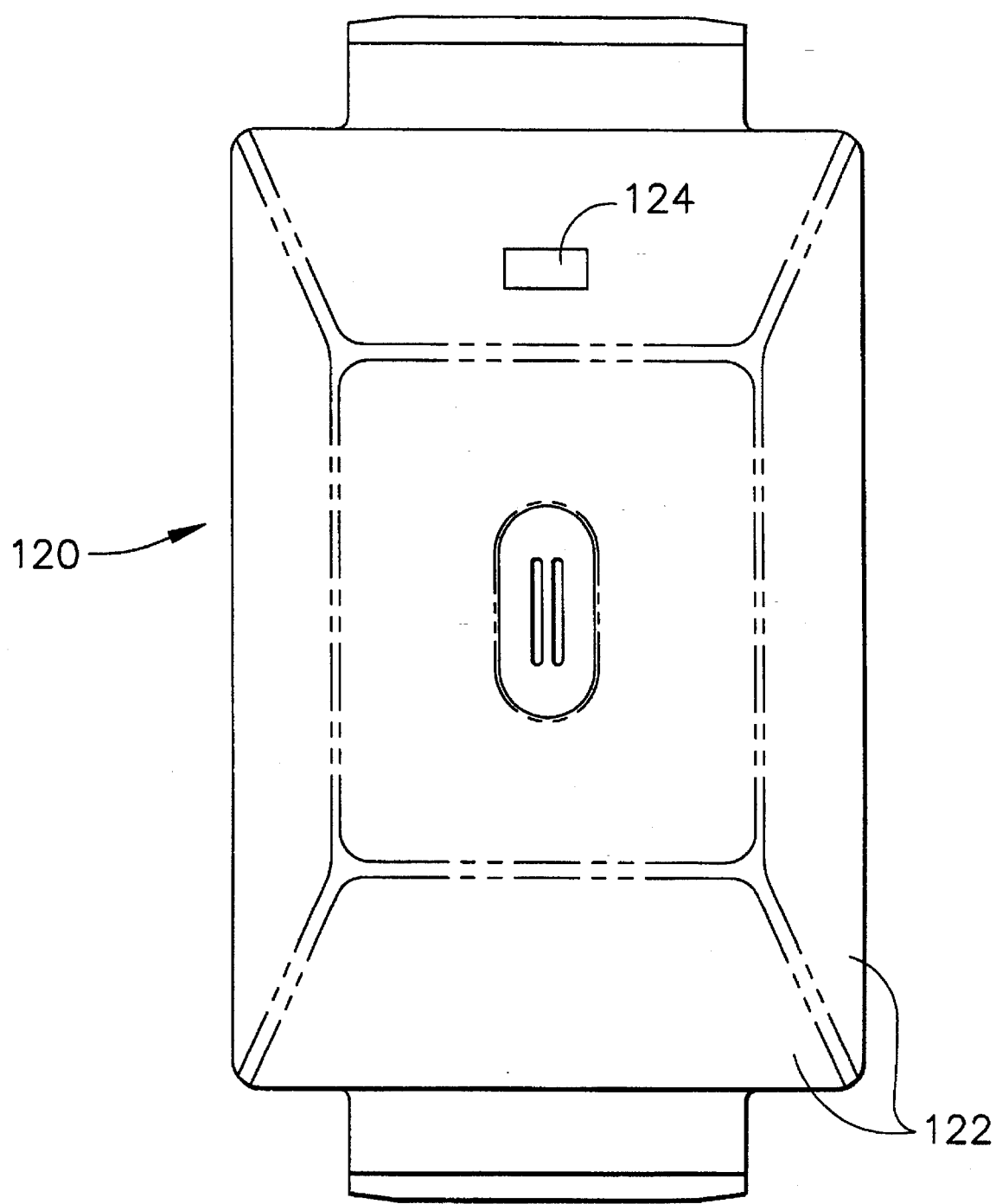
FIG. 31 is an outside top view of the light housing of FIG. 30.

The illumination means is shown in FIGS. 30 and 31. A light housing 120 is dimensioned to hold a light bulb and is shaped to fit onto the top member 20 in the approximate center between retainer tabs. As such, light emitted from the bulb is directed through the louvered center area and into the bird cage enclosure. The louver openings aid in diffusing the light and additionally the bulb's intensity is less noticeable from outside of the cage. The housing 120 is open-bottomed with a flat top wall 121 and four angled side walls 122. A socket post 123 for a socket and bulb (not shown) is provided on an inside wall and a cord plug opening 124 is provided in one side wall to allow the electric cord plug to lead to the socket. A square-shaped plug 125 of the electric cord for use with the housing 120 is shown in FIGS. 9 and 10. A vent opening 126 is also provided in the flat top wall 121 to allow heat from the bulb to escape. Retainer tabs 127 on the top member 20 as seen in FIG. 29 are used to hold the light housing 120 in place.

The bird cage of the invention can be used as a cage to be placed on a pedestal or some other flat surface in the home. A turn table or some other swivel-type article can also be used and, for this purpose, the base member 11 is provided with fastener holes 128 in its bottom surface (see FIGS. 2 and 4). Foot pads 129 on the bottom of the base member are also provided for when the bird cage sits on a surface where scratching is to be avoided (see FIG. 4).

In a preferred embodiment, the bird cage is provided with a hanger suspension system so that the cage can be hung from an external structure such as a ceiling hook or a free-standing bird stand. The bird cage 10 has a hanger suspension system for this purpose. FIGS. 32, 34–39 and 42–45 illustrate this aspect of the invention.

Figure 32:
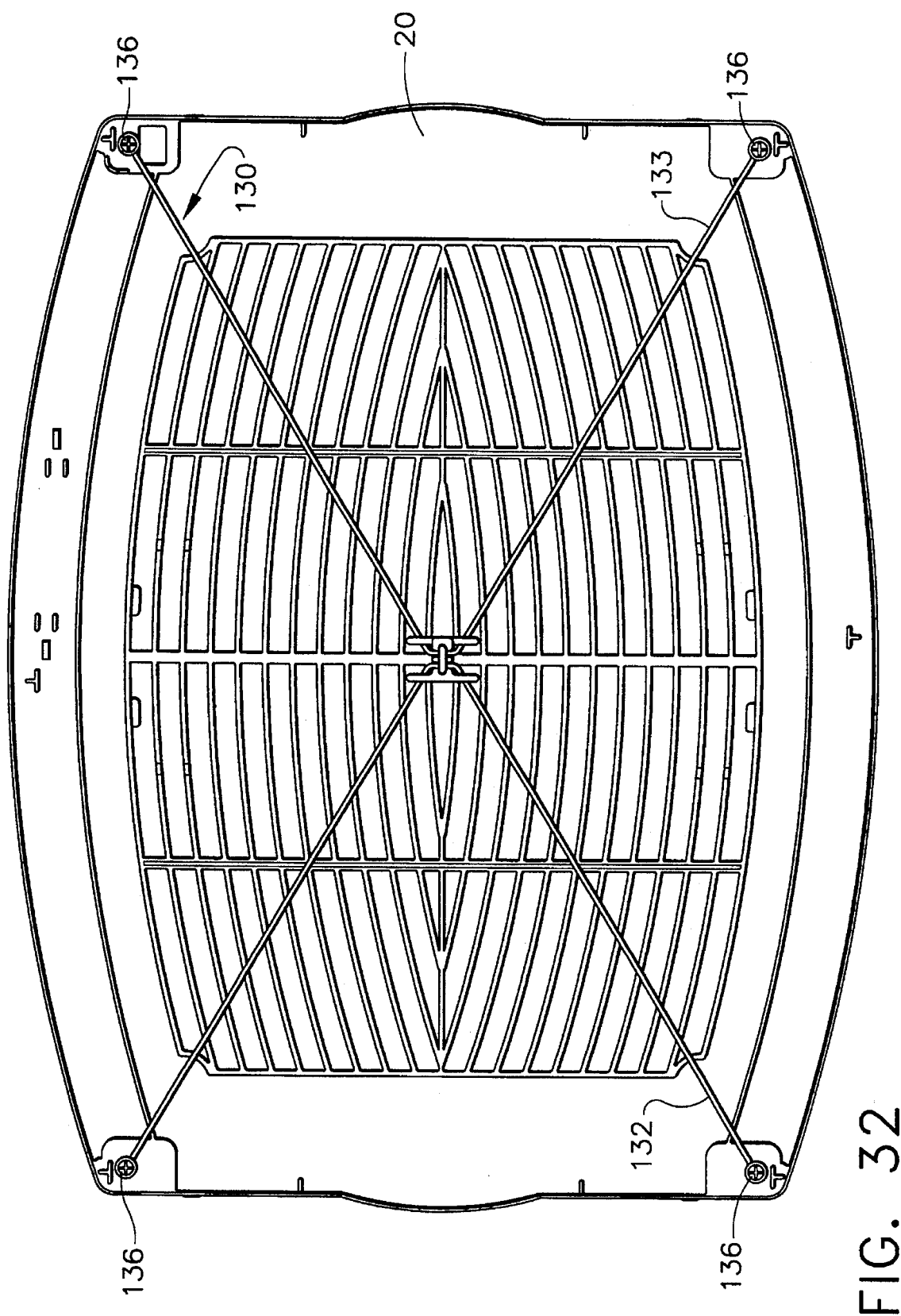
FIG. 32 is a top view of the top member of FIG. 29 showing a hanger suspension system in position.

The hanger suspension system 130 for the bird cage 10 comprises an H-shaped retainer clip 131, a first V-shaped wire 132 and a second V-shaped wire 133, a hook wire 134 and, optionally, a retainer ball 135. As seen in FIG. 32, the system is secured to the top member 20 of the bird cage by a set of fasteners, e.g. screws 136 which engage the ends of the two V-shaped wires 132 and 133, extend through fastener holes 110 in the top member 20 and into the fastener holes 44 in the top surface of each vertical post. The V-shaped wires are dimensioned such that the hook wire is centered and the bird cage hangs in a level manner.

The H-shaped retainer clip 131 used in the hanger assembly is best seen in FIGS. 36–39. It has a cross leg 137 and two legs 138 and 139 extending from the ends of the cross leg 137 in both directions. The two legs are each provided with underside notches 140 on each side of the cross leg as evident in FIG. 38. The cross leg 137 is also provided with a topside recess 141 between the two legs 138 and 139 as evident in FIG. 39. Raised protrusions 142 approximately centered in the recessed area of the cross leg 137 and a groove 143 running the length of the cross leg are used to cooperatively hold and retain the V-shaped wires and to keep the hook wire in a vertical position. The cross leg groove 143 also extends vertically up each inside wall of the legs 138 and 139. The groove 143 receives the hook wire 134. Once seated, each V-shaped wire is positioned in one side of the cross leg topside divided recess such that its apex overlies a lower leg of the hook wire and is directed downwardly and outwardly through the underside notches 140. The ends of the V-shaped wires extend to the four corners of the top member 20 and the vertical posts 12–15. Each terminus of the V-shaped wires is eye-looped to allow a shank of the screws 136 to pass through but retain the screw's head. The looped ends are slightly bent to lie flat on the top member 20.

Figure 39:
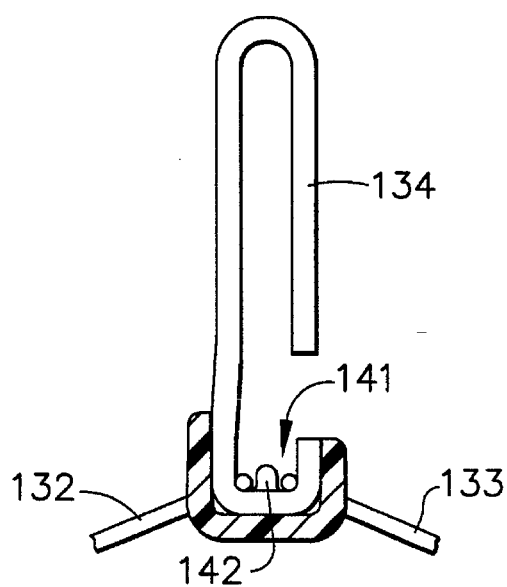
FIG. 39 is a front view partially in section of the H-shaped retainer clip of FIG. 36 showing a hanger hook positioned therein.

As evident in FIG. 39, the hook wire 134 is C-shaped. Its lower leg is trapped in the H-shaped retainer clip 131 by the two V-shaped wires. Its upper leg is free and available for engaging a ceiling hook or a free-standing display rack and associated hook member.

Figure 45:
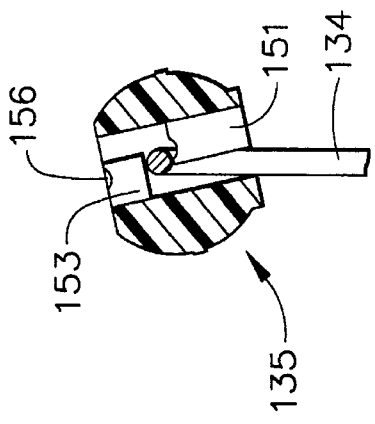
FIG. 45 is a sectional view of the retainer ball of FIG. 43 showing a step in its assembly onto the hanger hook of the hanger suspension system.
Figure 42:
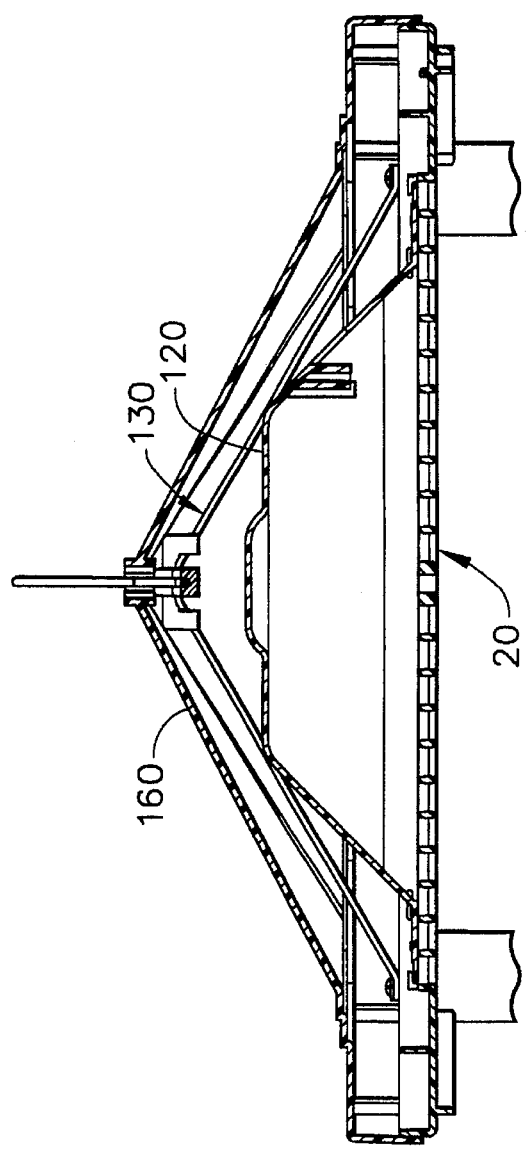
FIG. 42 is a side view partially in section of the top member, the hanger suspension system, the light housing and the covering of the pet habitat of FIG. 1.
Figure 44:
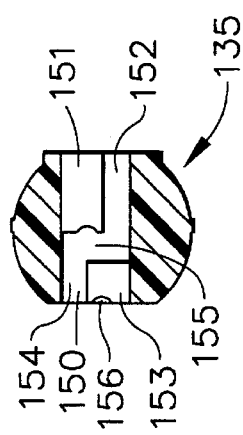
FIG. 44 is a side sectional view of the retainer ball of FIG. 43.
Figure 43:
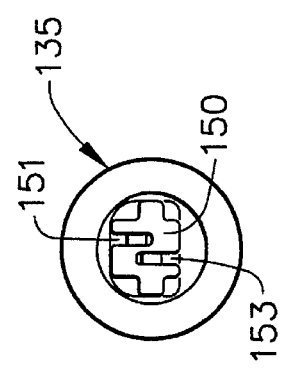
FIG. 43 is a bottom view of a retainer ball used with the hanger suspension system of FIG. 32.

Optionally, the retainer ball 135 is used with the hanger suspension system 130 for decorative purposes as well as to better grasp the hook wire 134. The retainer ball more importantly acts as a safety lock to prevent the covering 160 from being unintentionally lifted off the bird cage. With reference to FIGS. 43–45, the retainer ball 135 has a circuitous passageway 150 through its center. The passageway is sufficiently wide to receive the upper legs of the hook wire 134. A first off-center tab 151 extends from a wall in the entry end 152 of the passageway. A second off-center tab 153 extends from an opposite wall in the exit end 154 of the passageway. The tabs 151 and 153 extend inwardly sufficiently far to overlap with a free center space 155 between them. The hook wire 134 is initially inserted into the entry end 152 of the passageway. The retainer ball must then be manipulated to cause the top of the hook wire to pass through the free center space 155 and then to continue its travel upwardly unimpeded by the tab 153 in the exit end 154 of the passageway. Once the end of the hook wire exits the passageway, the retainer ball can be righted to cause the hook wire's upper end to rest in a groove 156 on top of the tab 153.

Once positioned, the retainer ball of the hanger suspension system is readily grasped. More importantly, the components of the bird cage are not inadvertently disassembled.

Figure 40:
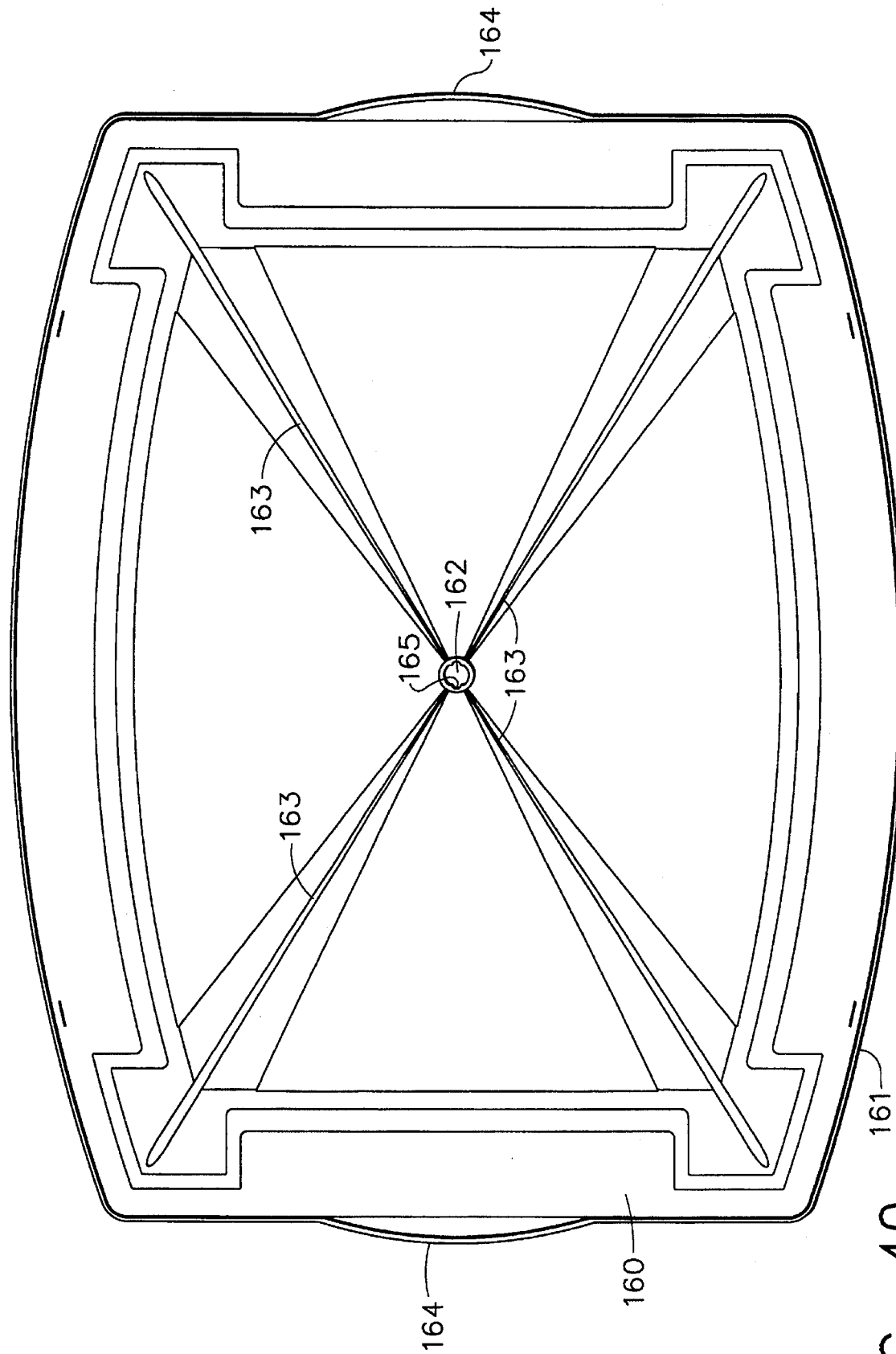
FIG. 40 is a bottom view of a covering used in the pet habitat of FIG. 1.
Figure 41:
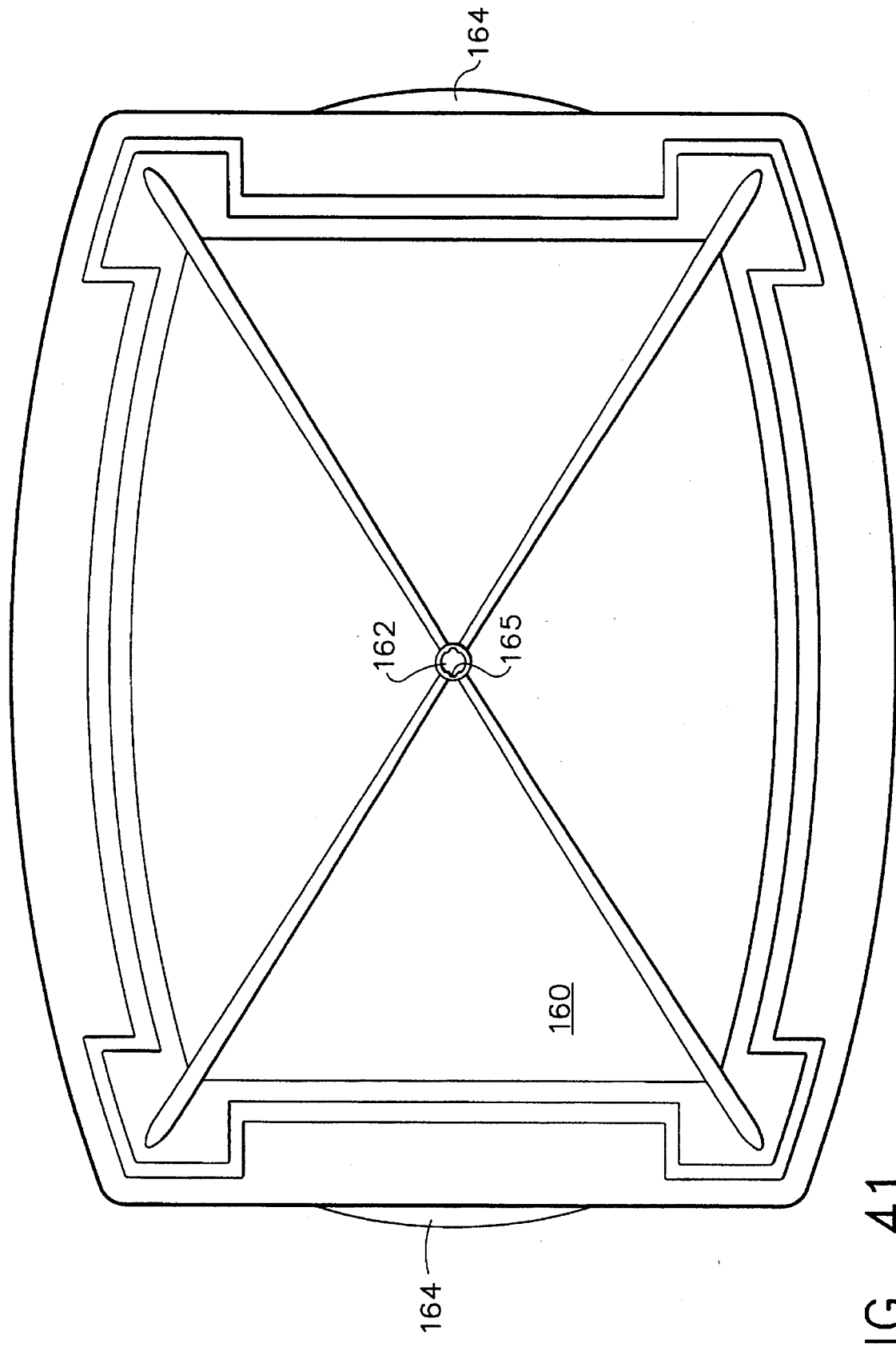
FIG. 41 is a top view of the covering of FIG. 40.

Primarily for appearance purposes and when the optional illumination means and its associated light housing is used, a covering 160 as illustrated in FIGS. 1, 40 and 41 is utilized. The covering is dome-shaped and dimensioned to substantially fully cover the top member 20. It has generally the same planar shape as the base member 11 and the top member 20. A lip 161 is provided on its underside and around its perimeter to overlie an edge of the top member and be retained. While not illustrated, a series of grooves on the inside face of the lip 161 and matching protruding ribs on the edge of the top member are used to hold the two components together. Additionally, a hole 162 is provided in its top center to allow the hook wire 134 to pass. Recesses 163 emanate from the top center hole 162 and extend to the four corners. Rounded side wall protrusions 164 are also provided on each of the lateral side walls of the covering to serve as handles for the removing of the covering from the top member. A set of side grooves 165 in the top center hole 162 are to receive the upper leg of the hook wire and lock it in place relative to the covering 160.

FIGS. 46–51 illustrate the clean-out drawer and a louvered floor grate. The clean-out drawer 170 and louvered floor grate 171 are positioned in the open compartment of the base member 11. The clean-out drawer 170 is dimensioned to slide along the first set of opposed lower ledges 29 in the base member and to substantially occupy the space in the open-top compartment of the base member. Its purpose is to provide a convenient means for catching bird droppings and cleaning the bird cage 10. The drawer's bottom surface 172 is flat and usually has a die cut disposable paper liner therein. Center locking ribs 173 on the underside of the clean-out drawer are placed to engage stop tabs 174 extending upwardly from the base member 11 to add a child-resistant feature to the bird cage 10. A finger pull protrusion 175 is provided on a front wall for convenience purposes.

Figure 50:
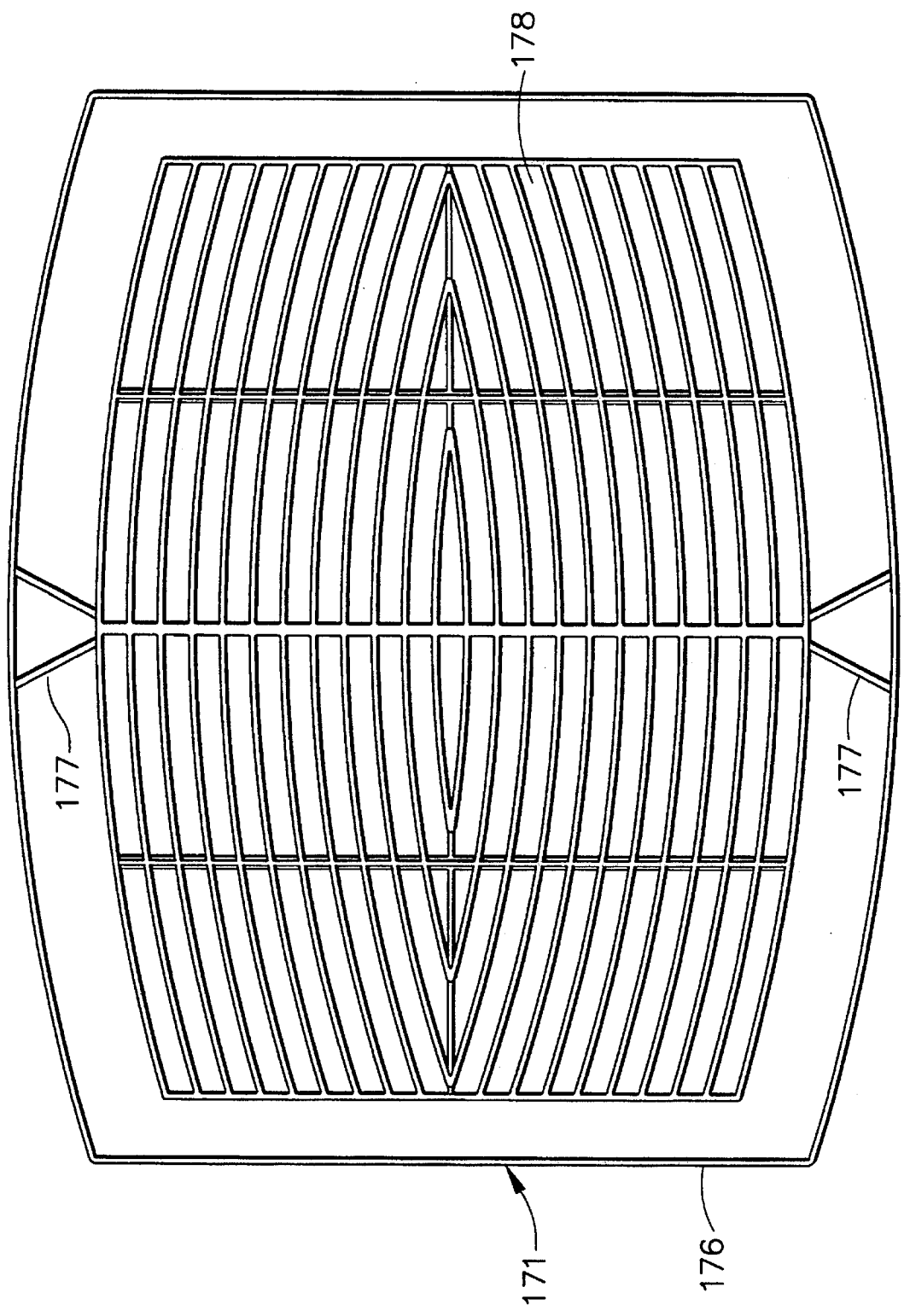
FIG. 50 is a bottom view of the louvered floor grate of FIG. 49.

The louvered floor grate 171 is dimensioned to slidably fit into the opposed upper ledges 30 in the-open-top compartment of the base member 11. It overlies the clean-out drawer 170 and disposable paper liners. A peripheral lip 176 extending from the underside of the floor grate is provided to engage the retaining ramps 31 in the base member 11 to add still another child-resistant feature to the bird cage 10. The underside of the floor grate as seen in FIG. 50 also has two V-shaped ribs 177 in an edge center area to prevent the clean-out drawer from catching on the floor grate when the floor grate is removed from the bird cage. Openings 178 in the louvered floor grate allows bird droppings to pass through and onto the disposable paper liner. The nature of the openings due to the louvers having a significant depth is such that the bird droppings on the paper liner have minimal visibility to the casual eye. Additionally, it serves as a floor surface such that the clean-out drawer can be removed for cleaning purposes without concern for the housed bird escaping.

An optional feature, though very preferred, is illustrated in FIGS. 1 and 53–66. A free-flowing feeder assembly 180 is configured to hang on the outside surface of the wire frame side wall sections with a feeding tray or water dish extending into the cage for the bird's use. The assembly is suitable as a source of seed or, with slight modification to the container, as a source of water. Several such feeder assemblies, while not shown, can be hung on wire frame side wall sections to provide for several days of feed and water.

Figure 60:
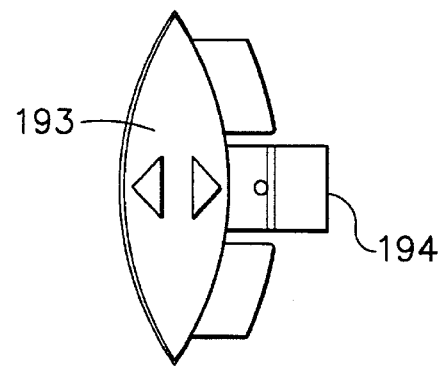
FIG. 60 is a top view of a slide lock used on the cap of FIG. 57.
Figure 61:
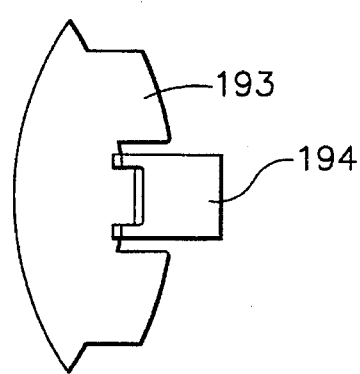
FIG. 61 is a bottom view of the slide lock of FIG. 60.
Figure 62:
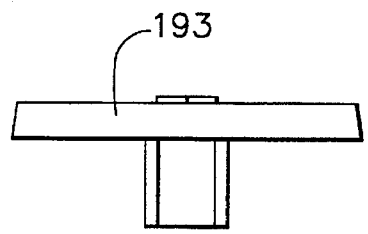
FIG. 62 is a front view of the slide lock of FIG. 60.
Figure 63:
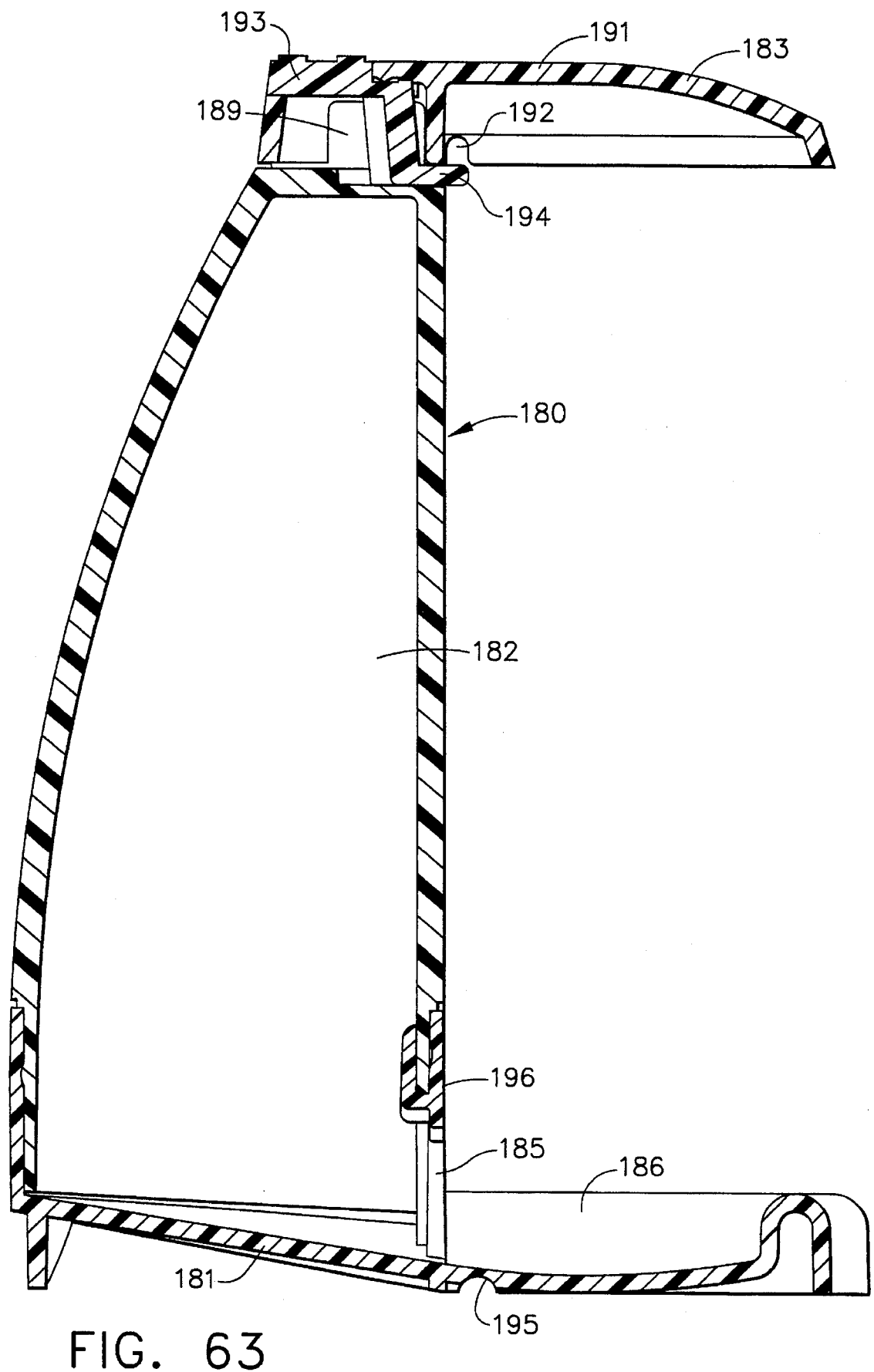
FIG. 63 is a side view in section of the free-flow feeder assembly of FIG. 1.
Figure 64:
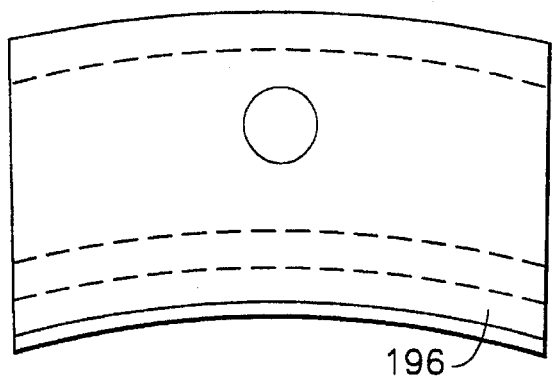
FIG. 64 is a front view of a seed size adapter for use on the feeder assembly of FIG. 1.
Figure 65:
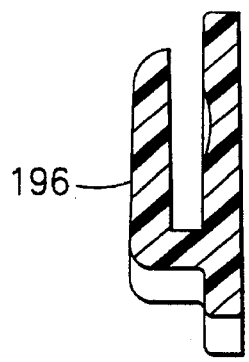
FIG. 65 is a side view of the seed size adapter of FIG. 64.
Figure 66:
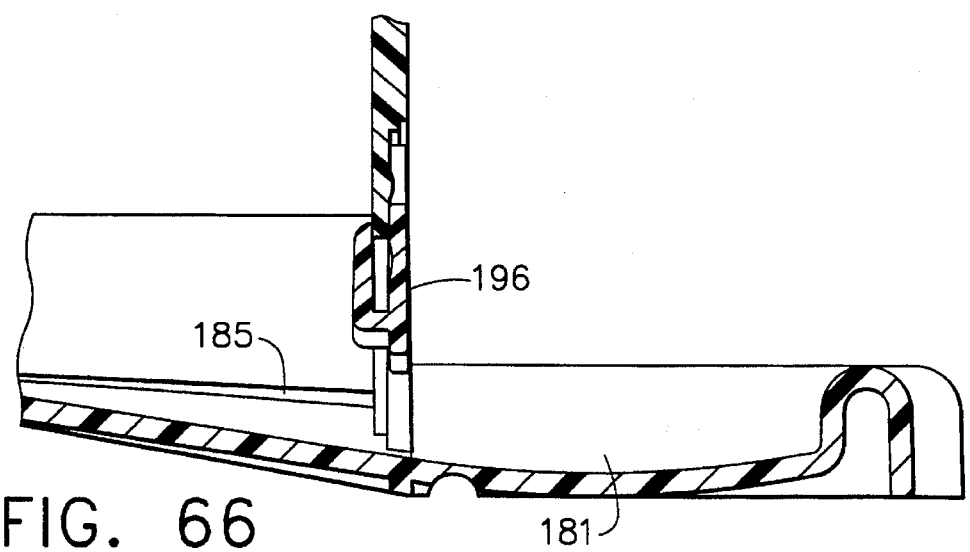
FIG. 66 is a partial side view in section of the feeder assembly of FIG. 63 showing the seed size adapter of FIG. 64 in position.

The feeder assembly shown in FIG. 1 is for containing and dispensing bird seed by gravity flow. As most evident in FIGS. 53–59, it comprises as its essential components a feeder base 181, a container 182, and a cap 183. The feeder base 181 is a substantially flat member having a semi-circular shape with an upwardly extending perimeter lip 184 and top surface which slopes downwardly towards a lip opening 185 and into a bowl 186. Extending from the feeder base 181 at each outside edge of its perimeter are perches 187. The container 182 has an open-bottom and walls which are shaped to fit onto the base 181 and within the perimeter lip 184. It has an opening 188 in a wall at its base which is positioned so as to be aligned with the lip opening 186 in the feeder base 181. Two cap retainer protrusions 189 on the container's top surface frictionally receive and hold the cap 183. The cap 183 is a flat member with a downwardly extending lower lip 190 designed to press down over the container's retainer protrusions 189 and remain there. A droppings deflector 191 extends horizontally from the cap to keep bird droppings out of the feeding tray. Wire notches 192 are formed in an underside of the deflector 191. As seen in FIGS. 60–62, a slide lock 193 with a tongue 194 is configured so as to be positioned within the droppings deflector 191. The tongue 194 has a length such that when the tab is pushed fully in it will engage a cross wire of the bird cage, thereby locking the feeder assembly to the bird cage.

The feeder base 181 also has a wire notch 195 in its underside to rest on a cross wire of the cage. The distance between the wire notch 195 in the feeder base 181 and the wire notch 192 in the cap 183 is determined by the height between cross wires of the wire frame side wall.

As seen in FIGS. 63–66, a snap-in size adapter 196 is configured to fit on the upper edge of the container opening 188 to effectively reduce its size. This allows the use of smaller seed within the container. The snap-in size adapter 196 has a width approximately equal to the width of the container opening 188. It has two vertical legs which are spaced apart a distance about equal to that of the container wall thickness. In use, the bottom side of the adapter is grasped and then placed into the opening with the two legs facing upwards. Pushing upwardly causes the legs to engage the container wall and remain.

Figure 67:
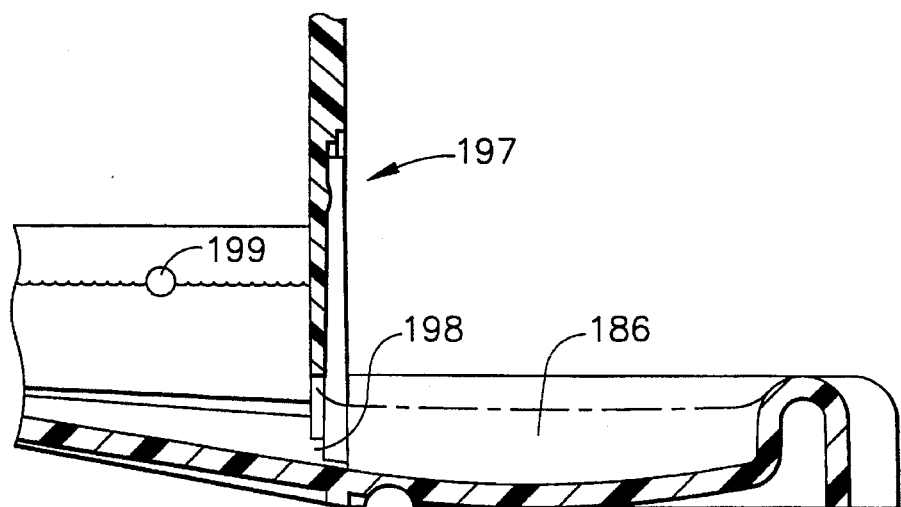
FIG. 67 is a partial side view in section of a free-flow water assembly for use on the pet habitat of FIG. 1.

The feeder assembly of FIGS. 1 and 53–66 can be converted to a water dispensing container. The only modification needed is to reduce the base opening in the container. The water surface tension at the opening and a slight vacuum within the container is sufficient to prevent water within the container from flowing continuously until emptied. FIG. 67 illustrates a water assembly 197 wherein all its components are the same as the feeder assembly 180 with the exception of the reduced base opening 198. A restricted amount of water flows through the reduced opening 198 into the bowl 186 of the base Such that the water level is always maintained. A brightly colored float 199 is optionally placed in the container to indicate the level of water from a distance.

Figure 68:
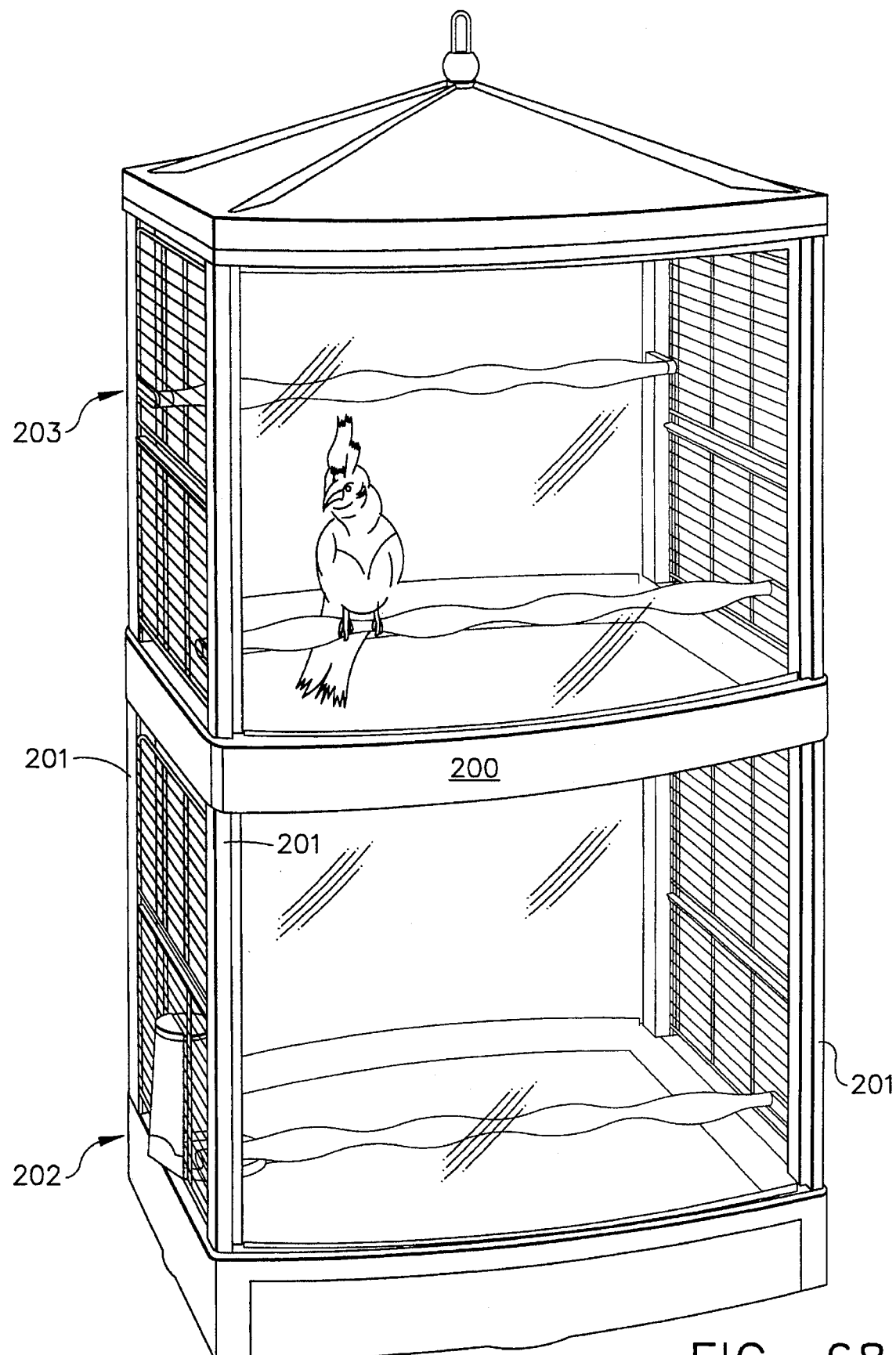
FIG. 68 is a perspective view of an embodiment of the invention wherein the pet habitat is enlarged with use of a collar.
Figure 70:
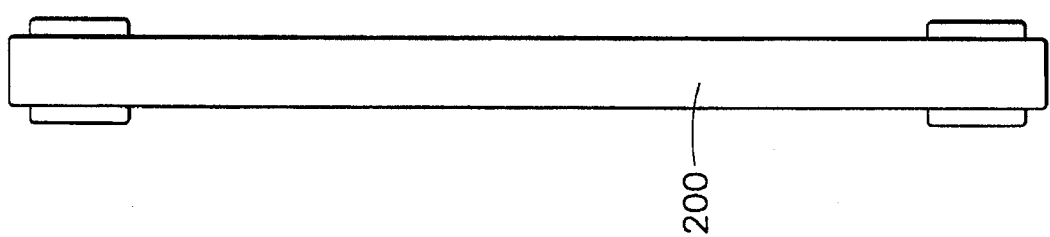
FIG. 70 is a side view of the collar of FIG. 69.
Figure 69:
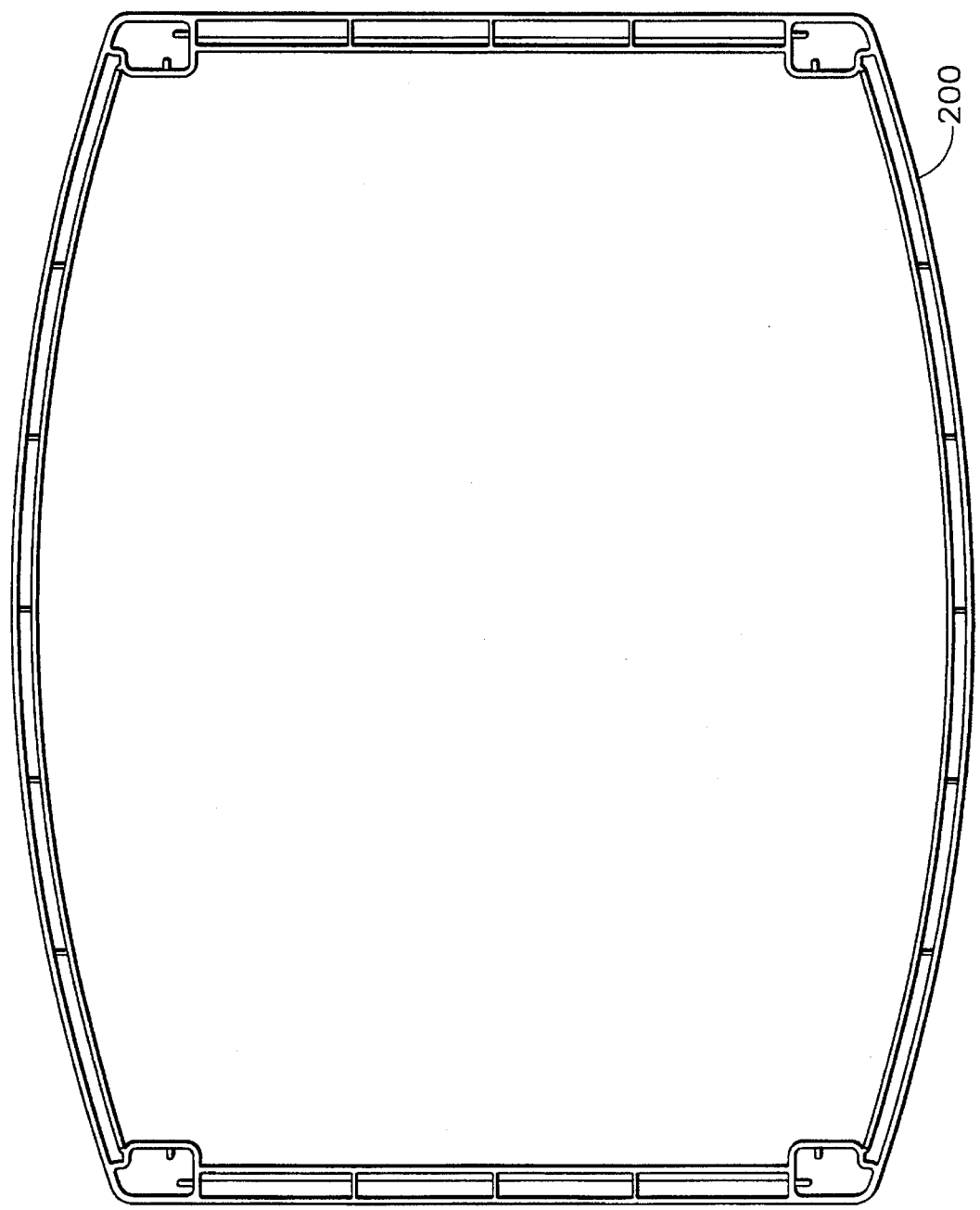
FIG. 69 is a bottom view of the collar used on the pet habitat of FIG. 68.

FIGS. 68–70 illustrate another embodiment of the invention where the bird cage 10 of FIG. 1 is modified to increase its interior space. In effect the bird cage is expanded with the aid of a collar 200 and double length vertical posts 201. The lower cage segment 202 is similar to the bird cage 10 shown in FIG. 1 with its top member, hanger suspension system, illumination means, and covering removed, while the upper cage segment 203 is similar to the bird cage 10 of FIG. 1 with its base member and associated components removed. In each instance the double length vertical posts 201 replace the single length vertical posts normally found in the bird cage 10. The collar 200 receives and stabilizes the double length vertical posts 201 extending through both the lower and upper segments and permanently holds them together. The collar also provides retainer ridges for the clear side wall sections.

Figure 71:
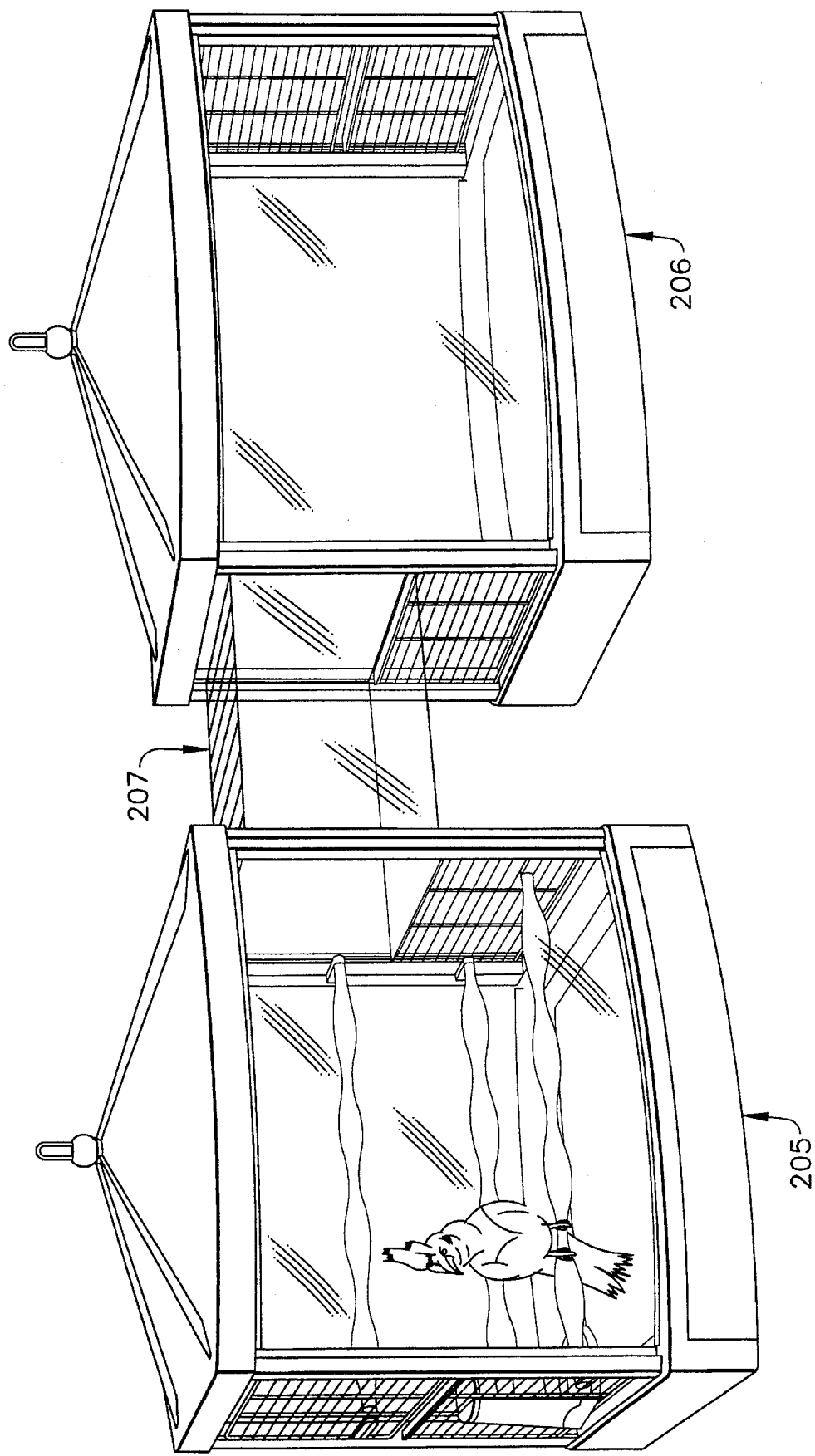
FIG. 71 is a perspective view of an embodiment of the invention wherein two pet habitats are connected by a tunnel addition.
Figure 72:
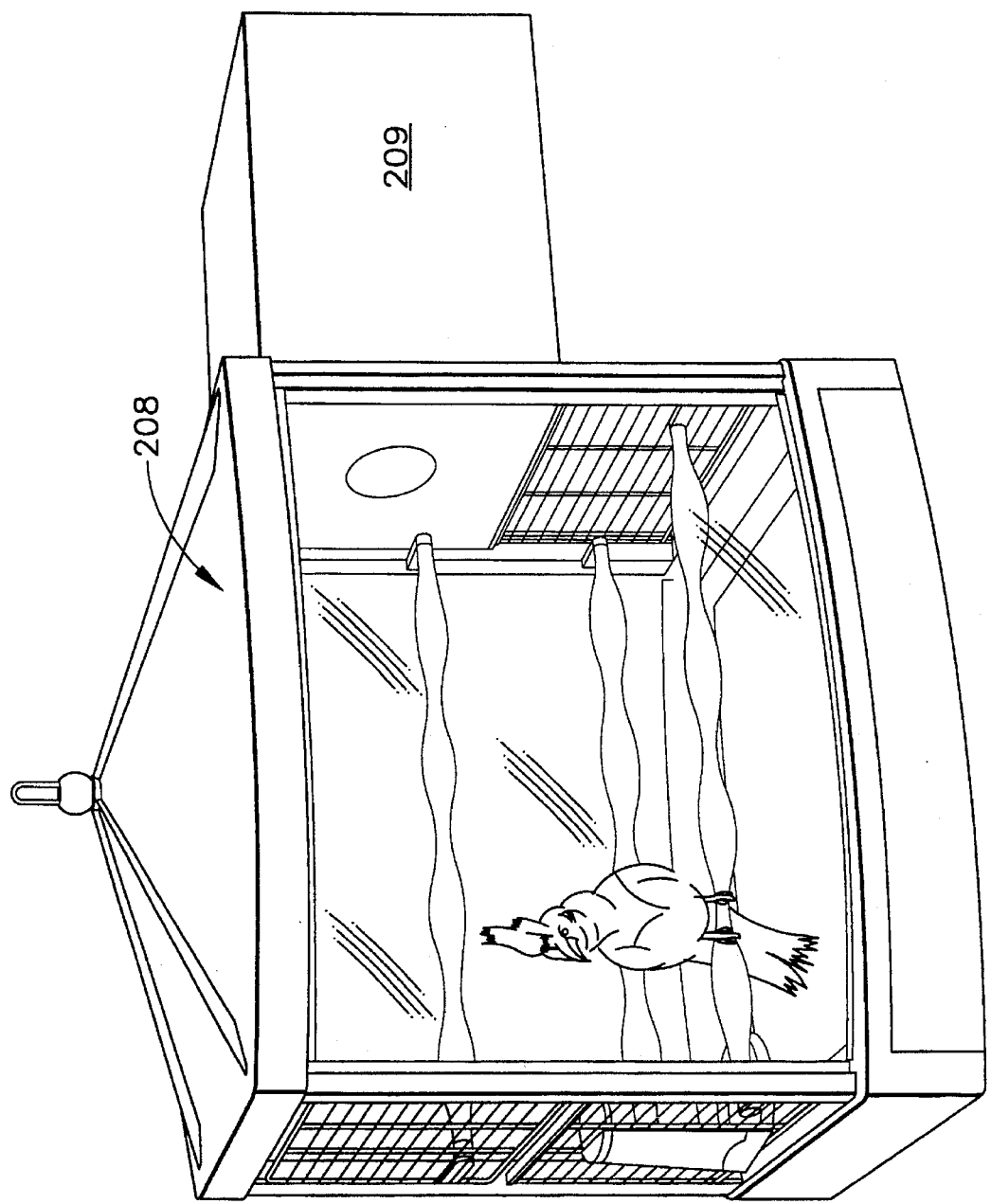
FIG. 72 is a perspective view of the pet habitat of the invention with a nesting box addition.
Figure 73:
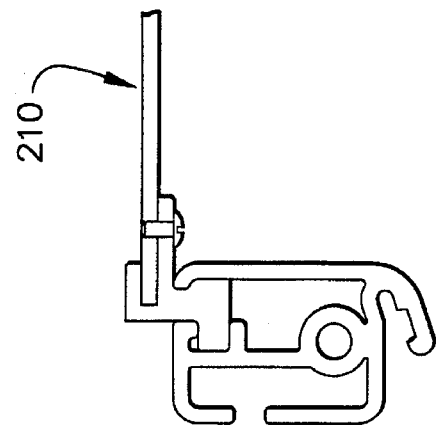
FIG. 73 is a top view of a connector adapter for the nesting box addition of FIG. 72.

FIGS. 71–73 illustrate two optional accessories. In FIG. 71, two bird cages 205 and 206 have a connector tunnel 207. In FIG. 72, a bird cage 208 has a nesting box 209 addition. The box 209 could as well be a bird bath or some other structure commonly used with bird cages. The tunnel and nesting box are configured to attach to the vertical posts of the cages in a manner such as shown in FIG. 73 using the adapter attachment system 210.

The aforedescribed components of the pet habitats as well as the assembled pet habitats are preferably configured to be stackable. They are stackable for shipping purposes and are stackable for in use purposes where two or more of the habitats are stacked together for a desired need or effect.

As aforementioned, the habitat of the invention is useful for housing many varieties of small animals. It should be readily apparent that the enclosure size, the type of wall sections and openings whether in the clear side wall or wire frame side wall sections are dimensioned primarily based on the animal to be caged. Such uses and needed changes to fit the pet animal to be housed should be evident.

Other changes and modifications to the pet habitat described should be apparent. All such changes and modifications of an obvious nature are considered within the scope of the appended claims.

We claim:

1. A pet habitat for housing at least one pet animal in a manner whereby an interior of the habitat can be viewed in an unobstructed mode, said pet habitat comprising:

(a) a base member having a bottom surface;

(b) at least two substantially vertical posts securely attached to the base member near its perimeter and further wherein each said at least two substantially vertical posts has an angled open channel extending vertically along a face thereof and has a slot extending vertically along another face thereof;

(c) a side wall barrier having (1) at least one substantially clear side wall section mounted in angled open channels of adjacent posts, each said at least one substantially clear side wall section allowing an unobstructed view of an interior of the cage and (2) at least one wire frame side wall section having a stationary segment slidably mounted in slots of adjacent substantially vertical posts and a door assembly segment hingeably mounted on one side to a substantially vertical post and latched on an opposite side to an adjacent substantially vertical post; and (d) a top member dimensioned to overlie the posts and attached thereto.

2. The pet habitat of claim 1 wherein the base member has from three to eight substantially straight sides and a post attachment means is located at each intersection of adjoining sides.

3. The pet habitat of claim 2 wherein the base member has four sides generally in the form of a rectangle and further wherein there are two opposed substantially clear side wall sections and two opposed wire frame side wall sections.

4. The pet habitat of claim 3 wherein each of the substantially vertical posts has an elongated body with a generally rectangular-shape cross section with the angled open channel extending along a first face thereof and the slot extending along a third face thereof which is opposed to said first face.

5. The pet habitat of claim 4 wherein the base member has a retainer ridge running along an edge of a top surface which has the substantially clear side wall section positioned thereon to aid in retaining the clear side wall section in a stable position.

6. The pet habitat of claim 5 wherein the clear side wall section mounted on two adjacent substantially vertical posts in angled channels thereof is bowed and the retainer ridge on the base member is curved such that a lower horizontal edge of the clear side wall section is in contact therewith and further wherein the clear side wall section has a finger hole near one vertical edge to aid in its removable from the adjacent vertical posts.

7. The pet habitat of claim 6 wherein the clear side wall sections are made of flexible polymeric material.

8. The pet habitat of claim 7 wherein the clear side wall sections are removably mounted in the channels of adjacent vertical posts by a spring fit.

9. The pet habitat of claim 4 wherein the wire frame side wall section is dimensioned to slide along the slots of adjacent substantially vertical posts.

10. The pet habitat of claim 1 wherein the door assembly segment of the wire frame side wall section has (i) a grid door with openings sufficiently small that the pet animal cannot escape, (ii) a hinge rod having open hook members rotatably holding a vertical side of the grid door and slidably positioned in the slot of the vertical post, and (iii) a latch rod having a latch mechanism yieldably holding an opposite vertical side of the grid door to prevent its rotation on the hinge rod and slidably positioned in the slot of an adjacent vertical post.

11. A bird cage with an enclosure for birds wherein the enclosure has a side wall which allows an unobstructed view of the interior of the enclosure from selected vantage points outside the enclosure, said bird cage comprising:

(a) a base member having a substantially flat bottom surface and side walls extending therefrom to form an open-top compartment, said base member further having from two to eight post cavities in top surfaces of the side walls at spaced intervals;

(b) a clean-out drawer slidably positioned within the open-top compartment of the base member, said clean-out drawer having a bottom surface for receiving droppings;

(c) a multiplicity of substantially vertical posts equal in number to the post cavities in the base member and wherein each vertical post is securely positioned in one of said post cavities, further wherein each said post has a channel and a first slot extending its full length, each said channel and slot located in the post to receive an edge of an enclosure side wall section;

(d) a side wall barrier formed from (1) at least one substantially clear side wall section removably mounted in the channel of two adjacent vertical posts, said at least one substantially clear side wall section allowing the unobstructed view of the enclosure's interior and (2) at least one wire frame side wall section mounted in the slots of two adjacent vertical posts; and (e) a top member dimensioned to overlie the side wall barrier and secured to the substantially vertical posts.

12. The bird cage of claim 11 wherein the base member has a rectangular-shape and has a post cavity in each corner thereof.

13. The bird cage of claim 12 wherein there are two substantially clear side wall sections, each clear side wall section removably mounted on the vertical posts so as to be opposed to one another.

14. The bird cage of claim 13 further wherein each of the post cavities is tab keyed and each vertical post is rectangular-shaped with a center wall extending the length thereof and having an angled ledge along a first wall of the post to form the channel so as to receive an edge of the substantially clear side wall section and an opposed third wall of the post has the slot to receive an edge of the wire frame side wall section.

15. The bird cage of claim 14 wherein each of the vertical posts further has a second slot extending the length of a fourth wall thereof and further comprising a perch holder having a semi-circle cap in a first end to receive a terminus of a perch and a rail in a second end slidably positioned in the second slot of the vertical post.

16. The bird cage of claim 14 wherein the base member has a retainer ridge extending along a top surface of one side wall to provide support for a clear side wall section.

17. The bird cage of claim 15 wherein the retainer ridge on the base member is curved and with the angled ledges on the vertical posts force the clear side wall section to assume a bowed-shape.

18. The bird cage of claim 14 wherein each wire frame side wall section has two vertical frame wires, at least two horizontal frame wires and multiple vertical and horizontal mid-wires to form a grill pattern with openings sufficiently small to prevent escape of a bird and further wherein each of the horizontal frame wires has both terminuses bent at a right angle to slidably fit into the slots of the vertical posts.

19. The bird cage of claim 18 wherein at least one wire frame side wall section is comprised of (i) a stationary segment having a width sufficient such that it slides into the slots of adjacent vertical posts, and (ii) a door assembly segment vertically disposed from the stationary segment and hingeably mounted to act as a door for gaining access to the interior of the door cage.

20. The bird cage of claim 19 further wherein a hinge rod with hook-like members is slidably positioned in a slot of a vertical post over the stationary segment and a latch rod with a latch mechanism is slidably positioned in a slot of an adjacent vertical post directly over the stationary segment and the grid door is hingeably mounted at one side to the hinge rod and latched at an opposite side to the latch rod.

21. The bird cage of claim 20 further comprising a threshold perch positioned on a top of the stationary segment of the wire frame side wall section to provide a flattened surface for perching.

22. The bird cage of claim 11 further comprising a louvered floor grate slidably positioned within the open-top compartment of the base member and directly over the clean-out drawer, said floor grate allowing the droppings to pass therethrough and serving as a floor for the enclosure.

23. The bird cage of claim 22 wherein the base member has a lower set of ledges on the inside of two opposed side walls to slidably receive the clean-out drawer and has an upper set of ledges on the inside of two opposed side walls above the lower ledges to hold the louvered floor grate.

24. The bird cage of claim 11 further having a hanger suspension system securely attached to the top member of the bird cage such that the bird cage can be suspended from an external structure.

25. The bird cage of claim 24 wherein the hanger suspension system comprises (i) an H-shaped retainer clip, (ii) a first V-shaped wire which is positioned over a cross leg of the H-shaped retainer clip and under a first leg thereof wherein each end of said first V-shaped wire extends to a corner of the top member and is attached thereto, (iii) a second V-shaped wire which is positioned over the cross leg of the H-shaped retainer clip and under a second leg thereof wherein each end of said second V-shaped wire extends to opposed corners of the top member, and (iv) a hook wire locked at a lower end to the H-shaped retainer clip by the V-shaped wires and extending therefrom with an upper end bent downwardly to form a U-shaped end.

26. The bird cage of claim 25 wherein the hanger suspension system further comprises a retainer ball positioned on the hook wire, said retainer ball having a passageway with a set of off-center tabs extending therethrough wherein said retainer ball is slipped over the hook wire by a set of manipulations.

27. The bird cage of claim 26 further having a domed covering with a hole in an approximate center point and positioned over the hanger suspension system such that the hook wire extends through the hole and the retainer ball when positioned on the hook wire is on the outside of the domed covering.

28. The bird cage of claim 27 further having a light housing positioned on the underside of the domed covering and illumination means therein.

29. The bird cage of claim 28 wherein the top member is louvered to allow light from the illumination means to diffuse into the enclosure.

30. The bird cage of claim 28 wherein at least one vertical post has a channel extending therethrough to receive an electric cord and further having the electric cord extending through the channel of the post and to the illumination means in the housing of the covering.

31. A bird cage with an enclosure for birds wherein the enclosure has a side wall which allows an unobstructed view of the interior of the enclosure from selected vantage points outside the enclosure, said bird cage comprising:

(a) a rectangular-shaped base member having a substantially flat bottom surface and side walls extending therefrom to form an open-top compartment, said base member further having a corner post cavity in a top surface of the side walls;

(b) a clean-out drawer slidably positioned within the open-top compartment of the base member, said clean-out drawer having a bottom surface for receiving droppings;

(c) a louvered floor grate slidably positioned within the open-top compartment and directly over the clean-out drawer, said floor grate allowing the droppings to pass therethrough and to serve as a floor for the enclosure of the bird cage whereby the louvered floor grate substantially obstructs a view of the clean-out drawer's bottom surface;

(d) four substantially vertical posts each being securely positioned in one of the corner post cavities, further wherein each said post has an angled ledge on one face thereof extending its full length to form a channel and a first slot in an opposite face thereof extending its full length, wherein said channel and slot located in each said post receives an edge of a side wall section;

(e) a side wall barrier formed from (1) at least one substantially clear side wall section removably mounted in the channels of two adjacent vertical posts said at least one substantially clear side wall section having a bowed-shape and providing the unobstructed view of the enclosure's interior and (2) at least one wire frame side wall section mounted in the slots of two adjacent vertical posts; and (f) a top member dimensioned to overlie the side wall barrier, said top member having post cavities in an underside to receive the substantially vertical posts and secured thereto.

32. The bird cage of claim 31 wherein there are two substantially clear side wall sections, each said clear side wall section removably mounted in the channels of adjacent vertical posts so as to be opposed to one another.

33. The bird cage of claim 32 wherein the base member has a curved retainer ridge extending along a top surface of each longitudinal side wall to provide support for the opposed clear side wall sections.

34. The bird cage of claim 33 wherein at least one wire frame side wall section is comprised of (i) a stationary segment having a width sufficient such that it slides into the slots of adjacent vertical posts, and (ii) a door assembly segment vertically disposed from the stationary segment, said door assembly segment having a grid door hingeably mounted for gaining access to the interior of the bird cage.

35. The bird cage of claim 34 further wherein a hinge rod with hook-like members is slidably positioned in the slot of a vertical post over the stationary segment and a latch rod with a latch mechanism is slidably positioned in the slot of an adjacent vertical post directly over the stationary segment and the grid door is hingeably mounted at one side to the hinge rod and latched at an opposite side to the latch rod.

36. The bird cage of claim 35 further having a hanger suspension system securely attached to the top member of the bird cage such that the bird cage can be suspended from an external structure, said hanger suspension system comprising (i) an H-shaped retainer clip, (ii) a first V-shaped wire which is positioned over a cross leg of the H-shaped retainer clip and under a first leg thereof wherein each end of said first V-shaped wire extends to a corner of the top member and is attached thereto, (iii) a second V-shaped wire which is positioned over the cross leg of the H-shaped retainer clip and under a second leg thereof wherein each end of said second V-shaped wire extends to opposed corners of the top member, and (iv) a hook wire locked at a lower end to the H-shaped retainer clip by the V-shaped wires.

37. The bird cage of claim 36 further having a domed covering with a hole having side grooves in an approximate center point and positioned over the hanger suspension system such that the hook wire extends through the hole and engages the side grooves thereof to prevent a rotational outside force from turning the hook wire.

38. The bird cage of claim 31 further comprising a feeder assembly snap-mounted onto one of the wire frame side walls.

39. A pet habitat for housing at least one pet animal in a manner whereby at least one substantially clear side wall section allows an unobstructed viewing of the pet animal, said pet habitat comprising:

(a) a base member having a bottom surface;

(b) at least two substantially vertical posts securely attached to the base member near its perimeter and further wherein each said at least two substantially vertical posts has an angled open channel extending vertically along a face thereof to receive an edge of the at least one substantially clear side wall section and to hold said at least one substantially clear side wall section in a bowed-shape for reduced glare and ready removal;

(c) a side wall barrier having the at least one substantially clear side wall section, said at least one substantially clear side wall section made of flexible polymeric material and removably mounted on adjacent substantially vertical posts by a spring-fit; and (d) a top member dimensioned to overlie the substantially vertical posts and attached thereto.

40. The pet habitat of claim 39 wherein the base member has from three to eight substantially straight sides and a post attachment means is located at each intersection of adjoining sides.

41. The pet habitat of claim 40 further comprising at least one wire frame side wall section mounted on adjacent substantially vertical posts.

42. The pet habitat of claim 41 wherein the base member has four sides generally in the form of a rectangle and further wherein there are two opposed substantially clear side wall sections and two opposed wire frame side wall sections.

43. The pet habitat of claim 39 wherein the base member has a retainer ridge running along an edge of a top surface which has the substantially clear side wall section positioned thereon to aid in retaining said substantially clear side wall section in a stable position.

44. The pet habitat of claim 43 wherein the substantially clear side wall section mounted on two adjacent substantially vertical posts in angled channels thereof is bowed and the retainer ridge on the base member is curved such that a lower horizontal edge of the substantially clear side wall section is in contact therewith and further wherein the substantially clear side wall section has a finger hole near one vertical edge to aid in its removable from the adjacent substantially vertical posts.

* * * * *